(12) United States Patent
Hu et al.

(10) Patent No.: US 12,437,413 B2
(45) Date of Patent: *Oct. 7, 2025

(54) IMAGE PROCESSING METHOD AND APPARATUS, COMPUTER DEVICE, AND STORAGE MEDIUM

(71) Applicant: TENCENT TECHNOLOGY (SHENZHEN) COMPANY LIMITED, Shenzhen (CN)

(72) Inventors: Yifan Hu, Shenzhen (CN); Yefeng Zheng, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/673,627

(22) Filed: May 24, 2024

(65) Prior Publication Data

US 2024/0312022 A1 Sep. 19, 2024

Related U.S. Application Data

(63) Continuation of application No. 17/499,993, filed on Oct. 13, 2021, now Pat. No. 12,033,330, which is a
(Continued)

(30) Foreign Application Priority Data

Sep. 25, 2019 (CN) .......................... 201910912096.1

(51) Int. Cl.
*G06T 7/11* (2017.01)
*G06N 5/022* (2023.01)
*G06T 7/136* (2017.01)

(52) U.S. Cl.
CPC ................ *G06T 7/11* (2017.01); *G06N 5/022* (2013.01); *G06T 7/136* (2017.01); *G06T 2207/20081* (2013.01)

(58) Field of Classification Search
CPC . G06T 7/11; G06T 7/136; G06T 2207/20081; G06T 7/194;
(Continued)

(56) References Cited

U.S. PATENT DOCUMENTS 10,430,946 B1 * 10/2019 Zhou .................. A61B 5/02007
10,846,889 B2    11/2020 Phogat et al.
(Continued)

FOREIGN PATENT DOCUMENTS

CN    108537292 A    9/2018
CN    109242849 A    1/2019
(Continued)

OTHER PUBLICATIONS

International Search Report with translation and Written Opinion regarding PCT/CN2020/115209 dated Dec. 15, 2020, 11 pages.
Chinese Office Action with English concise explanation of relevance regarding 201910912096.1 dated Jun. 29, 2023, 7 pages.
Chinese Office Action with English concise explanation of relevance regarding 201910912096.1 dated Jan. 30, 2024, 4 pages.

*Primary Examiner* — Tom Y Lu
(74) *Attorney, Agent, or Firm* — Crowell & Moring LLP

(57) ABSTRACT

The present disclosure provides methods, devices, apparatus, and storage medium for determining a target image region of a target object in a target image. The method includes: obtaining a target image comprising a target object; obtaining an original mask and an image segmentation model, the image segmentation model comprising a first unit model and a second unit model; downsampling the original mask based on a pooling layer in the first unit model to obtain a downsampled mask; extracting region convolution feature information of the target image based on a convolution pooling layer in the second unit model and the
(Continued)

downsampled mask; updating the original mask according to the region convolution feature information; and in response to the updated original mask satisfying an error convergence condition, determining a target image region of the target object in the target image according to the updated original mask.

17 Claims, 12 Drawing Sheets

Related U.S. Application Data continuation of application No. PCT/CN2020/115209, filed on Sep. 15, 2020.

(58) Field of Classification Search
CPC ........ G06T 2207/20084; G06T 7/0012; G06N 5/022; G06N 3/045; G06N 3/048; G06N 3/084
See application file for complete search history.

(56) References Cited

U.S. PATENT DOCUMENTS

| | | |
|---|---|---|
| 12,033,330 B2 * | 7/2024 | Hu .................... G06N 5/022 |
| 2016/0328630 A1 | 11/2016 | Han et al. |
| 2017/0091951 A1 | 3/2017 | Yoo et al. |
| 2018/0075290 A1 | 3/2018 | Chen et al. |
| 2021/0142479 A1 | 5/2021 | Phogat et al. |

FOREIGN PATENT DOCUMENTS

| | | |
|---|---|---|
| CN | 109389557 A | 2/2019 |
| CN | 109493350 A | 3/2019 |
| CN | 109584246 A | 4/2019 |
| CN | 109886273 A | 6/2019 |
| CN | 109977798 A | 7/2019 |
| CN | 109978037 A | 7/2019 |
| CN | 110675385 A | 1/2020 |

* cited by examiner

IMAGE PROCESSING METHOD AND APPARATUS, COMPUTER DEVICE, AND STORAGE MEDIUM

RELATED APPLICATION

This application is a continuation application of U.S. patent application Ser. No. 17/499,993, filed on Oct. 13, 2021, which is incorporated herein by reference in its entirety. The U.S. patent application Ser. No. 17/499,993 is a continuation application of PCT Patent Application No. PCT/CN2020/115209, filed on Sep. 15, 2020, which claims priority to Chinese Patent Application No. 201910912096.1, filed with the China National Intellectual Property Administration on Sep. 25, 2019, both of which are incorporated herein by reference in their entireties.

FIELD OF THE TECHNOLOGY

This application relates to the field of computer technologies, and in particular, to an image processing method and apparatus, and a related device.

BACKGROUND OF THE DISCLOSURE

In the process of image research and application, people are often interested in some parts of each image. These parts are often referred to as targets or foreground and correspond to regions of the images that have unique properties. In order to identify and analyze the targets in the images, these regions need to be separated, and on this basis, it is possible to further process the targets. Image segmentation is to divide an image into characteristic regions and extract a target of interest.

At present, the segmentation of the target in the image is performed through manual segmentation, that is, the position of the target in the image is determined manually, and then an image region of the target is extracted manually, and the image region of the manual segmentation is followed up for image understanding.

The target in the manual segmentation image needs to go through the process of manual position determining, manual target segmentation, and the like, which will consume a lot of time, resulting in low efficiency of image segmentation.

The present disclosure describes embodiments for determining a target image region of a target object in a target image, addressing at least one of the problems/issues discussed above, improving image segmentation efficiency and/or improving the accuracy of the segmentation result.

SUMMARY

Embodiments of this application provide an image processing method and apparatus and a related device for determining a target image region of a target object in a target image, which may improve image segmentation efficiency.

The present disclosure describes a method for determining a target image region of a target object in a target image. The method includes obtaining, by a device, a target image comprising a target object. The device includes a memory storing instructions and a processor in communication with the memory. The method further includes: obtaining, by the device, an original mask and an image segmentation model, the image segmentation model comprising a first unit model and a second unit model; downsampling, by the device, the original mask based on a pooling layer in the first unit model to obtain a downsampled mask; extracting, by the device, region convolution feature information of the target image based on a convolution pooling layer in the second unit model and the downsampled mask; updating, by the device, the original mask according to the region convolution feature information; and in response to the updated original mask satisfying an error convergence condition, determining, by the device, a target image region of the target object in the target image according to the updated original mask.

The present disclosure describes an apparatus for determining a target image region of a target object in a target image. The apparatus includes a memory storing instructions; and a processor in communication with the memory. When the processor executes the instructions, the processor is configured to cause the apparatus to perform: obtaining a target image comprising a target object, obtaining an original mask and an image segmentation model, the image segmentation model comprising a first unit model and a second unit model, downsampling the original mask based on a pooling layer in the first unit model to obtain a downsampled mask, extracting region convolution feature information of the target image based on a convolution pooling layer in the second unit model and the downsampled mask, updating the original mask according to the region convolution feature information, and in response to the updated original mask satisfying an error convergence condition, determining a target image region of the target object in the target image according to the updated original mask.

The present disclosure describes a non-transitory computer-readable storage medium, storing computer-readable instructions. The computer-readable instructions, when executed by a processor, are configured to cause the processor to perform: obtaining a target image comprising a target object; obtaining an original mask and an image segmentation model, the image segmentation model comprising a first unit model and a second unit model; downsampling the original mask based on a pooling layer in the first unit model to obtain a downsampled mask; extracting region convolution feature information of the target image based on a convolution pooling layer in the second unit model and the downsampled mask; updating the original mask according to the region convolution feature information; and in response to the updated original mask satisfying an error convergence condition, determining a target image region of the target object in the target image according to the updated original mask.

Another aspect of the embodiments of this application provides an image processing method, performed by a computer device, the method including:
  obtaining a target image including a target object, and obtaining an original mask and an image segmentation model, the image segmentation model including a first unit model and a second unit model;
  downsampling the original mask based on a pooling layer in the first unit model to obtain a downsampling mask;
  extracting region convolution feature information of the target image based on a convolution pooling layer in the second unit model and the downsampling mask, and updating the original mask according to the region convolution feature information; and
  determining, in a case that an updated original mask satisfies an error convergence condition, a target image region of the target object in the target image according to the updated original mask.

Another aspect of the embodiments of this application further provides an image processing apparatus, including:

an image obtaining module, configured to obtain a target image including a target object;

a model obtaining module, configured to obtain an original mask and an image segmentation model, the image segmentation model including a first unit model and a second unit model;

a pooling module, configured to downsample the original mask based on a pooling layer in the first unit model to obtain a downsampling mask;

a convolution module, configured to extract region convolution feature information of the target image based on a convolution pooling layer in the second unit model and the downsampling mask;

an update module, configured to update the original mask according to the region convolution feature information; and a mask determining module, configured to determine, in a case that an updated original mask satisfies an error convergence condition, a target image region of the target object in the target image according to the updated original mask.

Another aspect of the embodiments of this application provides an electronic medical device, including a biological tissue image collector and a biological tissue image analyzer.

The biological tissue image collector obtains a biological tissue image including a lesion object, and obtaining an original mask and an image segmentation model, the image segmentation model including a first unit model and a second unit model.

The biological tissue image analyzer downsamples the original mask based on a pooling layer in the first unit model to obtain a downsampling mask.

The biological tissue image analyzer extracts region convolution feature information of the biological tissue image based on a convolution pooling layer in the second unit model and the downsampling mask, and updates the original mask according to the region convolution feature information.

The biological tissue image analyzer determines, in a case that an updated original mask satisfies an error convergence condition, a lesion image region of the lesion object in the biological tissue image according to the updated original mask.

Another aspect of the embodiments of this application provides a computer device, including a memory and a processor, the memory storing a computer program, the computer program, when executed by the processor, causing the processor to perform the image processing method in the embodiments of this application.

Another aspect of the embodiments of this application provides a computer storage medium, storing a computer program, the computer program including program instructions, the program instructions, when executed by a processor, performing the image processing method in the embodiments of this application.

BRIEF DESCRIPTION OF THE DRAWINGS

To describe the technical solutions of the embodiments of this application or the existing technology more clearly, the following briefly introduces the accompanying drawings required for describing the embodiments or the existing technology. Apparently, the accompanying drawings in the following description show only some embodiments of this application, and a person of ordinary skill in the art may still derive other accompanying drawings from these accompanying drawings without creative efforts.

DESCRIPTION OF EMBODIMENTS

The technical solutions in the embodiments of this application are clearly and completely described in the following with reference to the accompanying drawings in the embodiments of this application. Apparently, the described embodiments are merely some rather than all of the embodiments of this application. All other embodiments obtained by a person of ordinary skill in the art based on the embodiments of this application without creative efforts shall fall within the protection scope of this application.

Figure 1:
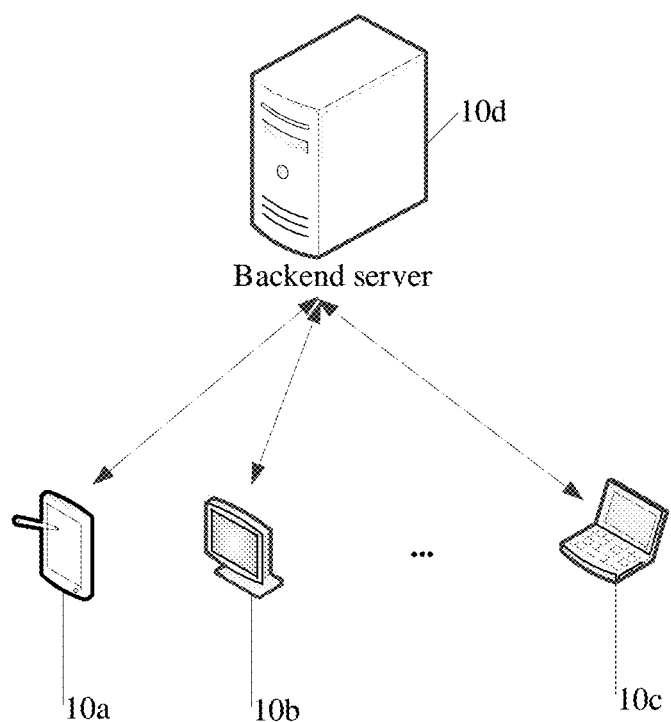
FIG. 1 is a system architecture diagram of image processing according to an embodiment of this application.

FIG. 1 is a system architecture diagram of image processing according to an embodiment of this application. This application relates to a backend server 10d and a terminal device cluster. For example, the terminal device cluster may include: a terminal device 10a, a terminal device 10b, . . . , and a terminal device 10c.

Using the terminal device 10a as an example, the terminal device 10a obtains a target image including a target object, the target object being a to-be-segmented object. The terminal device 10a transmits the target image to the backend server 10d, and after receiving the target image, the backend server 10d obtains an original mask and a trained image segmentation model. Downsampling is performed on the original mask based on a first unit model in the image segmentation model to obtain a downsampled mask. Region convolution feature information of the target image is extracted based on a second unit model in the image segmentation model and the downsampled mask, and the original mask is updated according to the region convolution feature information, the original mask being updated continuously and iteratively. When it is detected that an updated original mask satisfies an error convergence condition, the backend server 10d determines an image region of the target object in the target image according to the updated original mask.

Subsequently, the backend server 10d may deliver the determined image region to the terminal device 10a. The terminal device 10a may display the target image and mark the image region of the target object on the target image. Alternatively, the terminal device 10a may directly output the image region of the target object in the target image.

Certainly, the terminal device 10a may alternatively obtain the image segmentation model and the original mask, and the terminal device 10a further determines the image region of the target object in the target image.

The terminal device 10a, the terminal device 10b, the terminal device 10c, and the like shown in FIG. 1 may include a mobile phone, a tablet computer, a notebook computer, a palmtop computer, a mobile Internet device (MID), a wearable device, and the like.

Figure 2A:
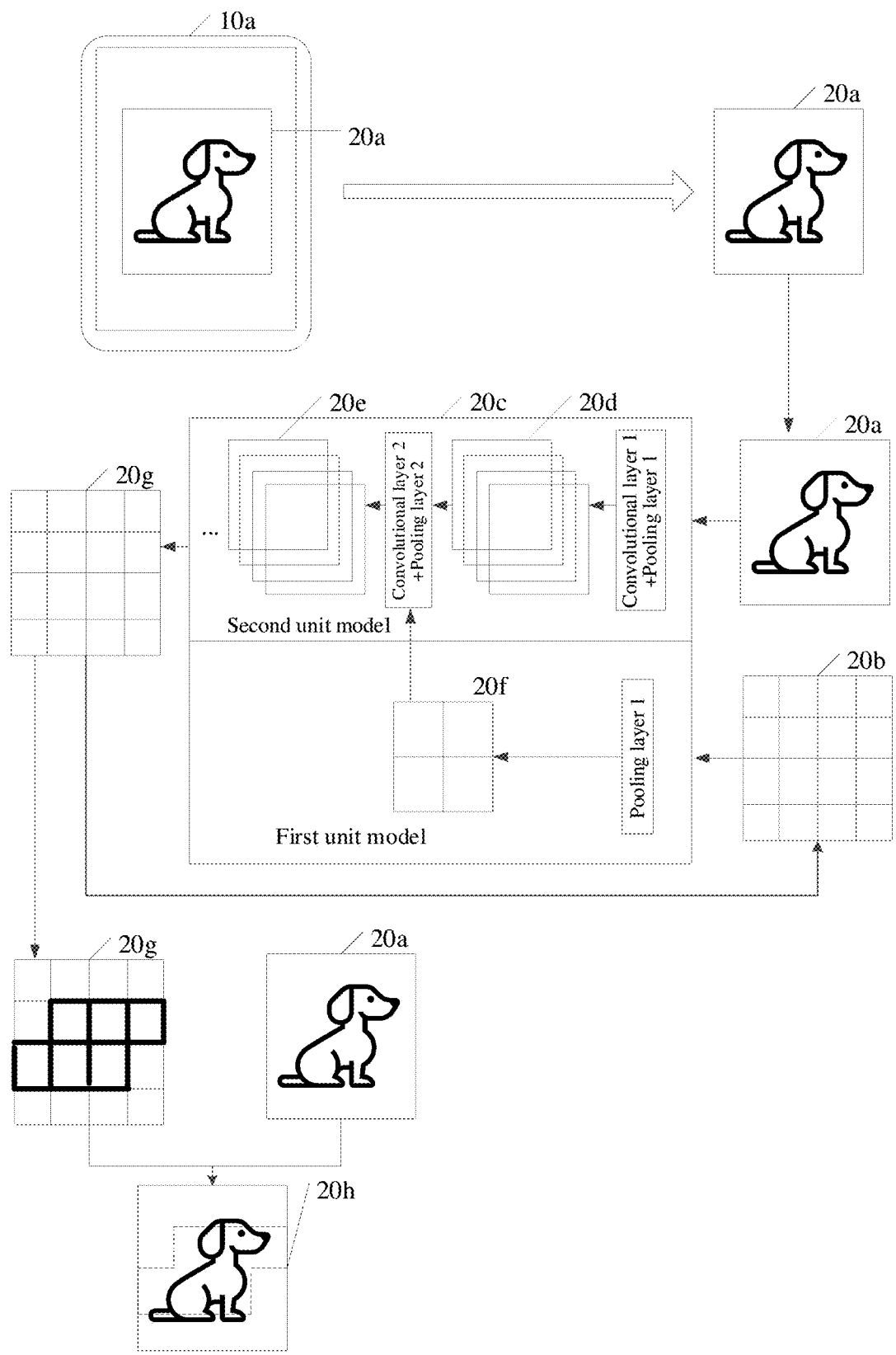
FIG. 2a and FIG. 2b are schematic diagrams of scenarios of image processing according to an embodiment of this application.
Figure 2B:
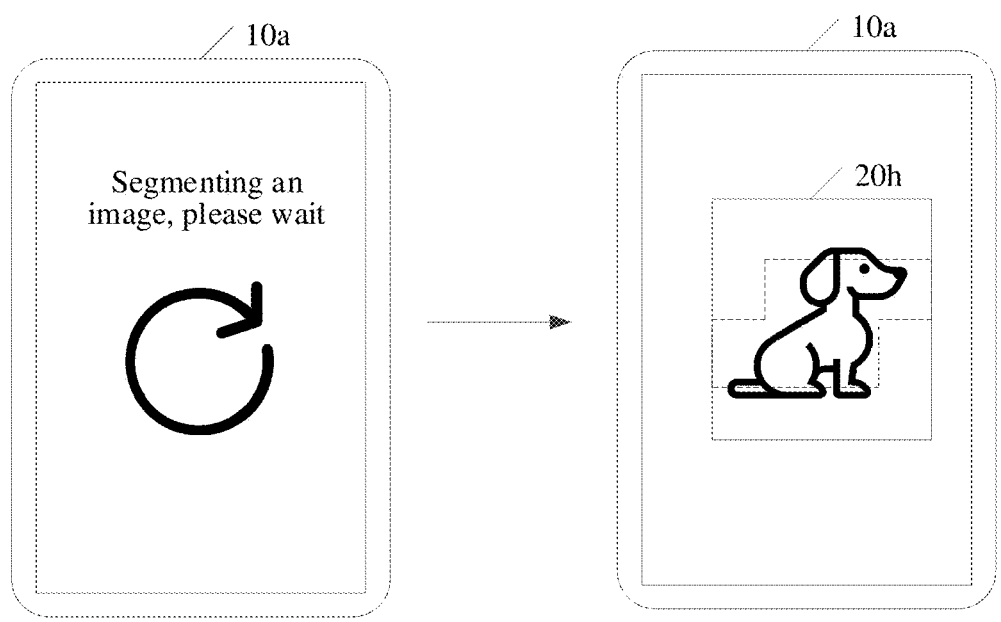

An example of how the terminal device 10a determines a region of a target object in a target image according to an original mask and an image segmentation model is used in FIG. 2a and FIG. 2b for specific descriptions:

FIG. 2a and FIG. 2b are schematic diagrams of scenarios of image processing according to an embodiment of this application. As shown in FIG. 2a, the terminal device 10a obtains a to-be-segmented image 20a, and the image 20a includes a to-be-segmented object—a dog, that is, an objective of image segmentation is to segment the dog in the image 20a from the image 20a.

The terminal device 10a obtains an original mask 20b having the same size as the image 20a. The original mask 20b and the image 20a having the same size means that each unit mask in the original mask 20b is in a one-to-one correspondence with each pixel in the image 20a. In an initial case, a value of each unit mask in the original mask 20b may be 0.

In various embodiments, a unit mask may be referred as a mask-unit.

It may be seen from FIG. 2a that, the original mask 20b includes 16 unit masks (4×4), and correspondingly, the size of the image 20a is also 4×4. Here in the present disclosure, a size of 4×4 for a mask and/or an image may be a simplified example, and in real situations, the size may be m×n, wherein m is a positive integer and n is another positive integer; m and n may be same or different. For example but not limited to, the size may be 320×240, 1024×768, 1280× 720, and etc.

The terminal device 10a obtains an image segmentation model 20c. It may be seen from FIG. 2a that the image segmentation model 20c includes a first unit model and a second unit model.

The first unit model includes 1 pooling layer 1, that is, only a pooling operation is performed in the first unit model. The second unit model includes 2 convolutional layers and 2 pooling layers, that is, a convolution operation and a pooling operation are performed in the second unit model. Certainly, both a quantity of pooling layers included in the first unit model and a quantity of convolutional layers and pooling layers included in the second unit model are not limited.

The terminal device 10a inputs the original mask 20b into the first unit model, and a pooling operation is performed on the original mask 20b by using the pooling layer 1 in the first unit model. The pooling operation is to reduce a size of the original mask 20b, and the pooling operation may include an average pooling operation and a max pooling operation. As shown in FIG. 2a, a mask 20f is obtained after a pooling operation is performed by the pooling layer on the original mask 20b with a size of 4×4, and a size of the mask 20f is reduced to 2×2.

The terminal device 10a inputs the image 20a into the second unit model, and a convolution operation and a pooling operation are performed on the image 20a by using the convolutional layer 1 and the pooling layer 1 in the second unit model to extract convolution feature information 20d of the image 20a. A size of a feature map of the convolution feature information 20d is 2×2, and a quantity of channels is 4. A convolution operation and a pooling operation are performed on the convolution feature information 20d by using the convolutional layer 2 and the pooling layer 2 in the second unit model and the mask 20f after the pooling to extract deeper convolution feature information 20e of the image 20a. A size of a feature map of the deeper convolution feature information 20e is also 2×2, and a quantity of channels is also 4, that is, a size of input data of the convolutional layer 2 and the pooling layer 2 is the same as a size of output data thereof.

If the first unit model further includes a pooling layer 2, the mask 20f is inputted into the pooling layer, e.g., the pooling layer 2, to obtain a mask with a smaller size. If the second unit model further includes a convolutional layer 3, a pooling layer 3, a convolutional layer 4, and a pooling layer 4, deeper convolution feature information is extracted according to the convolutional layer 3, the pooling layer 3, the convolutional layer 4, the pooling layer 4, and a mask with a smaller size.

A deconvolution operation is finally performed on convolution feature information extracted at the last time by using a transpose convolution layer, so that a size of a feature map after the deconvolution is the same as the size of the image 20a. By using a fully connected layer, the feature information after the deconvolution is mapped into a mask 20g, and a size of the mask 20g is the same as the size of the image 20a.

Then, a value of a unit mask greater than a mask threshold in the mask 20g is adjusted to 1, and a value of a unit mask less than or equal to the mask threshold in the mask 20g is adjusted to 0. It may be learned that a binary mask is obtained after the adjustment, and the binary mask is used as a new original mask.

In some implementations, for each unit mask in the mask 20g, it may be determined that a value of the unit mask is greater than a mask threshold. In response to determining that the value of the unit mask is greater than the mask threshold, the value of the unit mark is adjusted to 1; and in response to determining that the value of the unit mask is not greater than the mask threshold, the value of the unit mark is adjusted to 0. It may be learned that a binary mask is obtained after the adjustment, and the binary mask is used as a new original mask.

In other implementations, for each unit mask in the mask 20g, it may be determined that a value of the unit mask is smaller than a mask threshold. In response to determining that the value of the unit mask is not smaller than the mask threshold, the value of the unit mark is adjusted to 1; and in response to determining that the value of the unit mask is smaller than the mask threshold, the value of the unit mark is adjusted to 0. It may be learned that a binary mask is obtained after the adjustment, and the binary mask is used as a new original mask.

In some implementations, the mask threshold may be a pre-defined value, for example between 0 and 1, e.g., 0.7. In some implementations, the mask threshold may be a semi-dynamic value, which may be determined by the image segmentation model based on the image 20a and/or the original mask 20b.

So far, one update on the original mask 20b is completed.

Then the new original mask is inputted into the first unit model, and similarly, the image 20a is inputted into the second unit model, and the original mask is updated again by using the foregoing manners, continuously and iteratively. When a difference quantity between an original mask before the update and an original mask after the update is less than a difference quantity threshold, the original mask updated at the last time is used as a target mask 20g.

In some implementations, a difference quantity is calculated between an original mask before the update and an original mask after the update; and it is determined whether the difference quantity is less than a difference quantity threshold. In response to determining that the difference quantity is less than the difference quantity threshold, the original mask updated at the last time is used as a target mask 20g; and in response to determining that the difference quantity is not less than the difference quantity threshold, the original mask updated at the last time continues to another iteration for updating.

It may be learned that, a value of a unit mask in the target mask 20g can only be 1 or 0. If a value of a unit mask is 0, it indicates that a pixel corresponding to the unit mask is a pixel of the background. If a value of a unit mask is 1, it indicates that a pixel corresponding to the unit mask is a pixel of the dog.

In the target mask 20g, there are 6 unit masks with values of 1 (as shown in FIG. 2g, unit masks with values of 1 are identified in bold lines), and values of remaining unit masks are all 0.

Because the unit masks are in a one-to-one correspondence with pixels in the image 20a, a region corresponding to a unit mask with a value of 1 in the target mask 20g in the image 20a is an image region of the dog. In the image 20a, the terminal device 10a may identify the image region of the dog by using a dotted line to obtain an image 20h. Alternatively, the terminal device may directly extract a unit image in which the dog is located from the image 20a.

As shown in FIG. 2b, when the terminal device 10a determines a region of the dog in the image 20a, a preset animation may be played on the screen. When it is detected that the region is determined, the animation is stopped, and the image 20h obtained after identifying the image region of the dog is displayed on the screen. Alternatively, the extracted unit image in which the dog is located is directly displayed on the screen.

A specific process of extracting region convolution feature information of a target image (for example, the image 20a in the foregoing embodiment) based on an image segmentation model (for example, the image segmentation model 20c in the foregoing embodiment) to update an original mask (for example, the original mask 20b in the foregoing embodiment) may refer to the following embodiments corresponding to FIG. 3 to FIG. 9.

Figure 3:
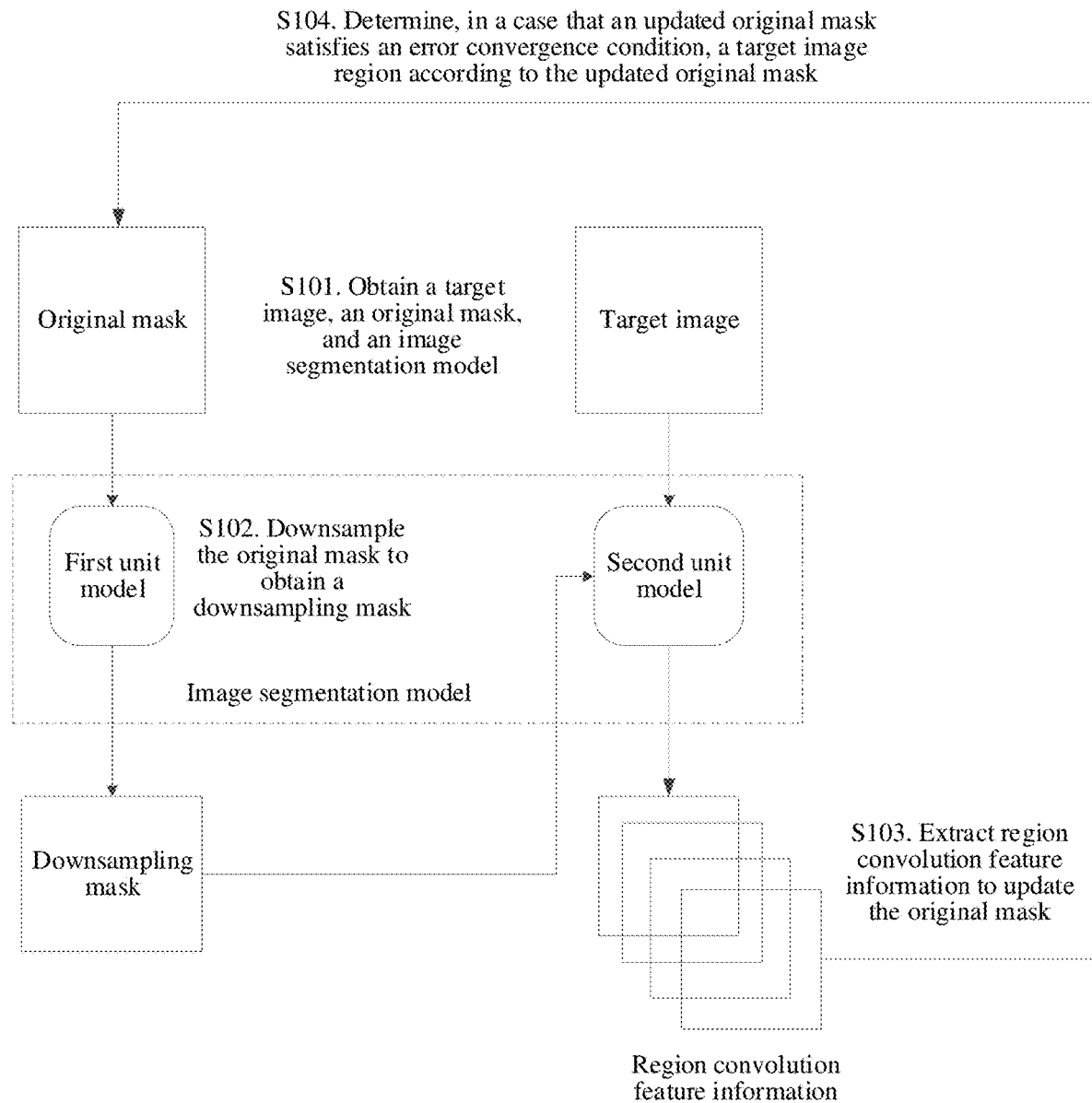
FIG. 3 is a schematic diagram of an image processing method according to an embodiment of this application.
Figure 11:
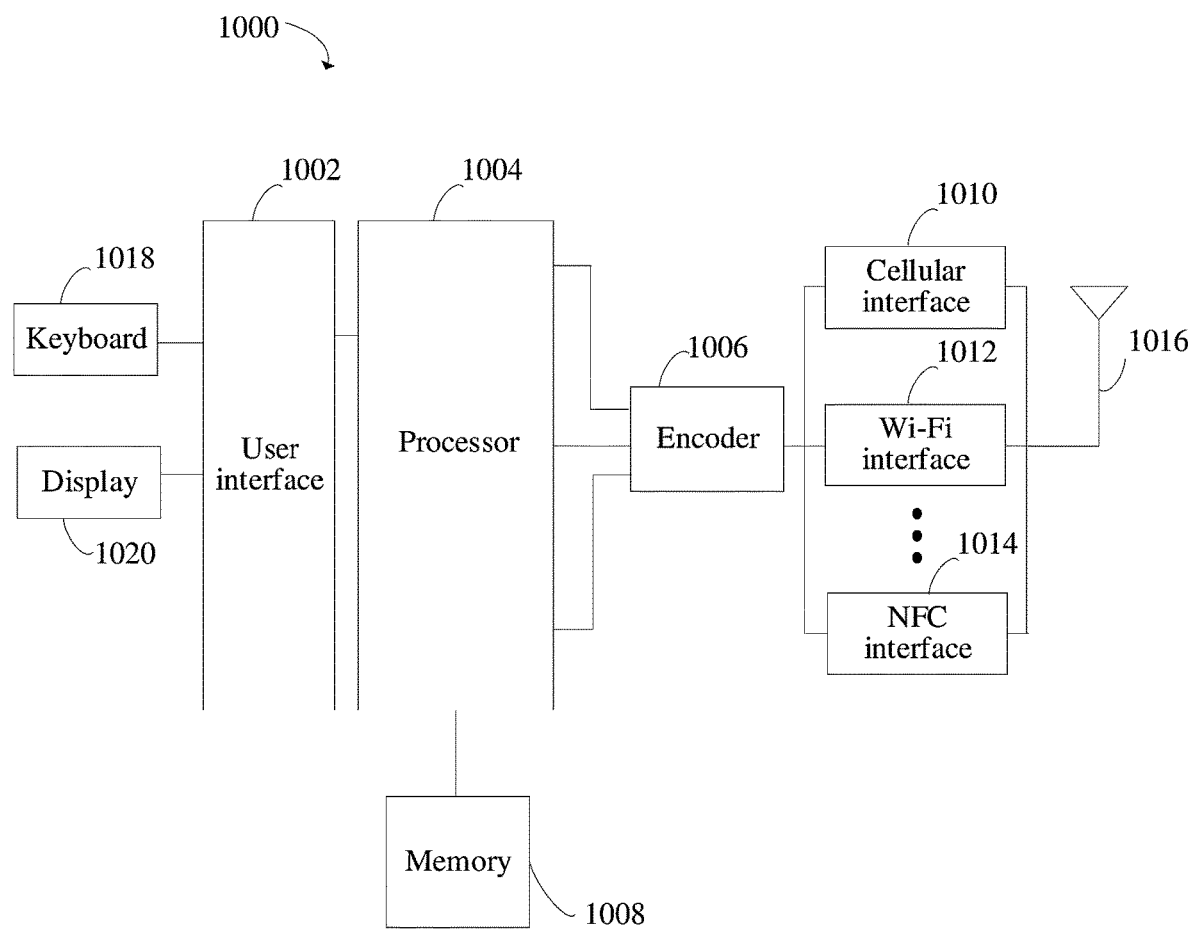
FIG. 11 is a schematic structural diagram of a computer device according to an embodiment of this application.

FIG. 3 is a schematic diagram of an image processing method according to an embodiment of this application, and the method may be performed by a computer device shown in FIG. 11. As shown in FIG. 3, the image processing method may include the following steps:

Step S101: Obtain a target image including a target object, and obtain an original mask and an image segmentation model, the image segmentation model including a first unit model and a second unit model.

Specifically, the terminal device 10a obtains a target image Is (for example, the image 20a in the embodiment corresponding to FIG. 2a and FIG. 2b, and a size of the target image $I_s$ may be represented as A1×B1) including a target object (for example, the dog in the embodiment corresponding to FIG. 2a and FIG. 2b), and the target object is a to-be-segmented object in the target image $I_s$.

The target object may be a lesion object, and correspondingly, a target image including the lesion object may be a biological tissue image. The biological tissue image may be a computed tomography (CT) image, a magnetic resonance imaging (MRI) image, an endoscopic image, or the like, and the target image may be a two-dimensional image, a three-dimensional image, or the like.

The terminal device 10a generates an original mask $mask_{res}$ (for example, the original mask 20b in the embodiment corresponding to FIG. 2a and FIG. 2b, and a size of the original mask $mask_{res}$ may also be represented as A1×B1) having the same size as the target image according to the size of the target image $I_s$ (A1×B1). The target image $I_s$ (A1×B1) is a combination of a plurality of pixels, similarly, the original mask $mask_{res}$(A1×B1) is a combination of a plurality of unit original masks, and the pixels are in a one-to-one correspondence with the unit original masks.

In various embodiments, a unit original mask may be referred as an original mask-unit.

In an initial case, values of all unit original masks in the original mask $mask_{res}$(A1×B1) may be 0 (in this application, the numerical value 0 is a first numerical value), certainly, may be 1 (the numerical value 1 is a second numerical value), or a random value.

The terminal device obtains an image segmentation model (for example, the image segmentation model 20c in the embodiment corresponding to FIG. 2a and FIG. 2b), and the image segmentation model includes a first unit model and a second unit model. The first unit model only includes a pooling layer (there may be one or more pooling layers), and the second unit model includes a convolution pooling layer (there may be one or more convolution pooling layers), the convolution pooling layer being a combination of a convolutional layer and a pooling layer. In addition, a quantity of the pooling layers included in the first unit model is equal to a quantity of the convolution pooling layers included in the second unit model.

Because the target object $I_s$ in the target image does not have a fixed shape and size, it is necessary to input an image segmentation model after preprocessing a to-be-segmented image based on a preprocessing rule, and segmentation accuracy may be improved subsequently after the preprocessing. The preprocessing on the to-be-segmented image is specifically described in the following:

An original image including a target object is obtained, and a pixel value of the original image is normalized into an interval from 0 to 1. The image normalization may be performed by using the following formula (1):

$$X_{nor} = \frac{X_{res} - X_{min}}{X_{max} - X_{min}} \quad (1)$$

$X_{nor}$ is any pixel after the normalization, $X_{res}$ represents a pixel value of any pixel in the original image, $X_{max}$ represents a maximum pixel value in the original image, and $X_{min}$ represents a minimum pixel value in the original image.

After the original image is normalized, translation, rotation, or symmetry may be performed on the normalized original image, and an objective is to enable the target object to be in a center position of the image.

The terminal device may further obtain a size threshold, and scale the image according to the size threshold, to enable an image after the size scaling to be the same as the size threshold.

The normalization, translation, rotation, symmetry, or scaling performed on the original image all may be referred to as preprocessing on the original image. Corresponding preprocessing may be performed on the original image according to an actual situation of the original image. The terminal device refers to an image obtained after preprocessing is performed on the original image as a target image $I_s$.

Step S102: Downsample the original mask based on a pooling layer in the first unit model to obtain a downsampling mask.

In various embodiments, a downsampling mask may be referred as a downsampled mask.

Specifically, the terminal device inputs the original mask $mask_{res}$(A1×B1) into the first unit model, and downsamples the original mask $mask_{res}$(A1×B1) based on the pooling layer in the first unit model to obtain a downsampled mask $mask_{input}$. The original mask may be downsampled by using average pooling, and the original mask may alternatively be downsampled by using max pooling. A size of the downsampled mask is less than the size of the original mask, but a quantity of channels of the downsampled mask is the same as a quantity of channels of the original mask.

If there are a plurality of pooling layers included in the first unit model, the original mask is downsampled continuously based on the plurality of pooling layers, that is, a size of the mask after the downsampling is continuously reduced. The terminal device may refer to a plurality of masks obtained through a plurality of times of downsampling as downsampled masks.

For example, if the pooling layer in the first unit model is half downsampling, after one pooling layer downsamples the original mask $mask_{res}$(A1×B1), a size of an obtained downsampled mask $mask_{input1}$ may be represented as (A1/2, B1/2). If another pooling layer downsamples the downsampled mask $mask_{input1}$ again, a size of an obtained downsampled mask $mask_{input2}$ may be represented as (A1/4, B1/4). Both the downsampled mask $mask_{input1}$ and the downsampled mask $mask_{input2}$ may be referred to as downsampled masks.

The average pooling is to, in a unit data set, use an average value of data included in the unit data set as a representation of the unit data set. The max pooling is to, in a unit data set, use maximum data in the unit data set as a representation of the unit data set.

Figure 4:
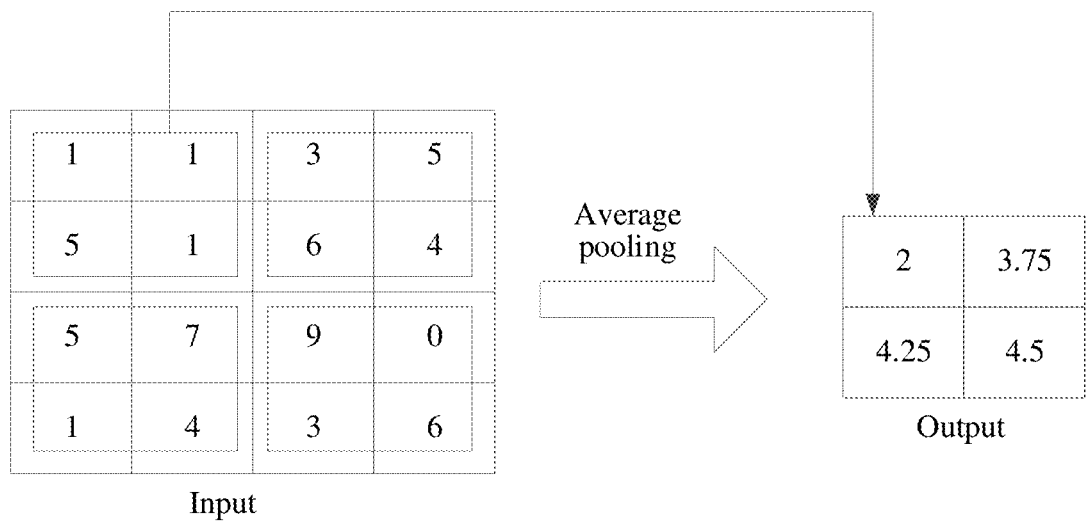
FIG. 4 is a schematic diagram of average pooling according to an embodiment of this application.

FIG. 4 is a schematic diagram of average pooling according to an embodiment of this application. Input data is traversed by using a pooling window of 2×2 and a stride of 2, and an average value of each window is calculated. An example in which a pooling window traverses an upper left corner of the input data is used: in this case, the pooling window includes a numerical value 1, a numerical value 1, a numerical value 5, and a numerical value 1. An average value of the foregoing 4 numerical values is calculated, that is, (1+1+5+1)/4=2. Therefore, after the pooling window traverses the upper left corner of the input data, a numerical value 2 is obtained after the average pooling. Average pooling may be performed on remaining part of the input data by using the foregoing manners separately to obtain output data.

Figure 5:
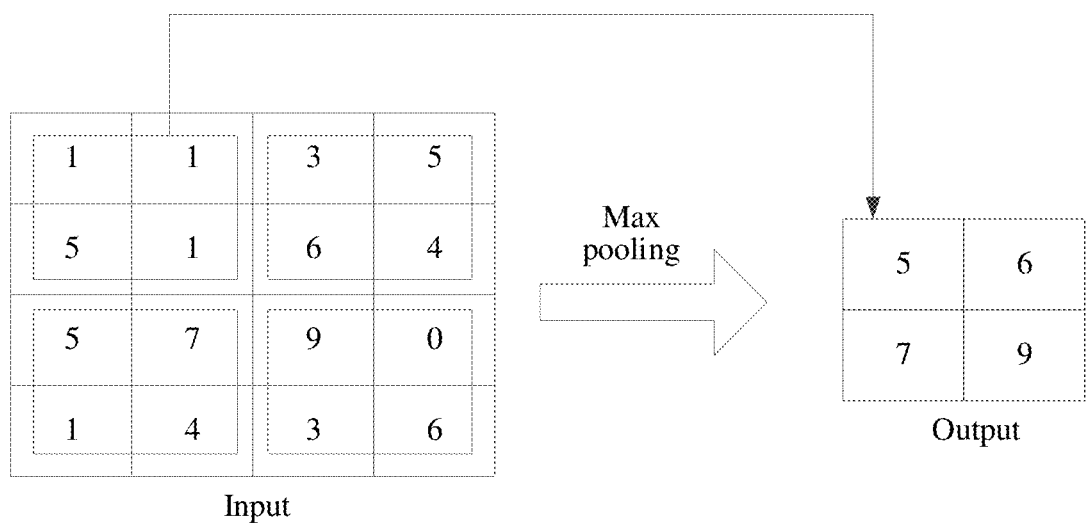
FIG. 5 is a schematic diagram of max pooling according to an embodiment of this application.

FIG. 5 is a schematic diagram of max pooling according to an embodiment of this application. Similarly, input data is traversed by using a pooling window of 2×2 and a stride of 2, and a maximum value of each window is calculated. An example in which a pooling window traverses an upper left corner of the input data is used: in this case, the pooling window includes a numerical value 1, a numerical value 1, a numerical value 5, and a numerical value 1. A maximum value in the 4 numerical values is 5. Therefore, after the pooling window traverses the upper left corner of the input data, a numerical value 5 is obtained after the max pooling. Max pooling may be performed on remaining part of the input data by using the foregoing manners separately to obtain output data.

Step S103: Extract region convolution feature information of the target image based on a convolution pooling layer in the second unit model and the downsampled mask, and update the original mask according to the region convolution feature information.

Specifically, the terminal device inputs the target image $I_s$(A1×B1) into the second unit model, and the second unit model may include one or more convolution pooling layers. The following describes that the second unit model includes one or more convolution pooling layers separately. First, how to update the original mask when the second unit model only includes one convolution pooling layer is described:

If the second unit model only includes one convolution pooling layer, correspondingly, the first unit model only includes one pooling layer (so that there is only one downsampled mask $mask_{input}$), and the first convolution pooling layer includes one first convolution pooling unit (for example, the convolutional layer 1 and the pooling layer 1 in the embodiment corresponding to FIG. 2a and FIG. 2b) and N second convolution pooling units (the convolutional layer 2 and the pooling layer 2 in the embodiment corresponding to FIG. 2a and FIG. 2b), N being an integer greater than 0. For simplicity, an example in which the first convolution pooling layer includes one second convolution pooling unit is used for description.

A convolution operation and a pooling operation are performed on the target image $I_s$(A1×B1) based on a convolution function and a pooling function in the first convolution pooling unit to obtain input convolution feature information T1 (a size of the input convolution feature information T1 may be represented as A2×B2, C2). The input convolution feature information T1 may be referred to as feature information formed by combining feature maps of C2 channels. A size of a feature map of each channel is A2×B2, and the size A2×B2 of the feature map of each channel is equal to the size of the downsampled mask $mask_{input}$.

The input convolution feature information T1(A2×B2, C2) is encoded (that is, a convolution operation is performed) based on a convolution function in the second convolution pooling unit to generate second convolution feature information T2(A2×B2, C2). A size of the second convolution feature information T2 is the same as the size of the input convolution feature information T1, and the same herein refers to that quantities of channels are the same and sizes of feature maps are the same.

The downsampled mask $mask_{input}$(A2×B2) and the second convolution feature information T2(A2×B2×C2) are substituted into the following formula (2) to calculate a pooling vector:

$$k_{1x} = \frac{\text{sum}(I_x * \text{mask}_{input})}{\text{sum}(\text{mask}_{input})}, \quad (2)$$

-continued $$k_{2x} = \frac{\text{sum}(I_x * (1 - \text{mask}_{input}))}{\text{sum}(1 - \text{mask}_{input})}, x \in 1, 2, \ldots, C2$$

$I_x$ in the formula (2) represents a feature map of an (x)th channel of the second convolution feature information T2(A2×B2, C2), and C2 represents a quantity of channels of the second convolution feature information. $k_{11}$, $k_{21}$, $k_{12}$, $k_{22}$, $k_{13}$, $k_{23}$ ... $k_{1x}$, $k_{2x}$ may be obtained according to the formula (2), and $k_{11}$, $k_{21}$, $k_{12}$, $k_{22}$, $k_{13}$, $k_{23}$ ... $k_{1x}$, $k_{2x}$ are used as the pooling vector.

It may be learned that, a quantity of numerical values included in the pooling vector is equal to 2* a quantity of channels in the second convolution feature information.

For example, a size of the second convolution feature information is a×b, 3, that is, the second convolution feature information includes 3 feature maps with a channel size of a×b. The second convolution feature information and the downsampled mask (the size of the downsampled mask=a size of a feature map of the input convolution feature information=a size of a feature map of the second convolution feature information, and therefore, a size of the downsampled mask is a×b) are substituted into the formula (2), and a pooling vector: [$k_{11}$, $k_{21}$, $k_{12}$, $k_{22}$, $k_{13}$, $k_{23}$] may be obtained.

It may also understood that the downsampled mask $\text{mask}_{input}$(A2×B2) is the same to all the channels.

The pooling vector is converted into a target vector: [$k'_{11}$, $k'_{21}$, $k'_{12}$, $k'_{22}$, $k'_{13}$, $k'_{23}$ ... $k'_{1x}$, $k'_{2x}$] based on a fully-connected (FC) function and an activation function (the activation function may be a Sigmoid function, a tanh function, or a ReLU function) in the second convolution pooling unit. Quantities of dimensions of the target vector and the pooling vector are the same, for example, if a quantity of dimensions of the pooling vector is 1×1×2C2, a quantity of dimensions of the target vector is also 1×1×2C2.

Then the downsampled mask $\text{mask}_{input}$(A2×B2) and the target vector are substituted into the following formula (3) to calculate region convolution feature information $T_{reg}$ of the target image:

$$K_x = k'_{1x} * \text{mask}_{input} + k'_{2x} * (1 - \text{mask}_{input}), x \in 1, 2, \ldots, C \quad (3)$$

$K_1, K_2, \ldots, K_x$ are combined into the region convolution feature information $T_{reg}$.

It may be seen from the formulas (2) and (3) that, when there is only one second convolution pooling unit, the size of the input convolution feature information T1(A2×B2, C2)=the size of the second convolution feature information T2(A2×B2, C2)=the size of the region convolution feature information $T_{reg}$(A2×B2, C2).

When there are a plurality of second convolution pooling units, after the downsampled mask $\text{mask}_{input}$(A2×B2) and the target vector are substituted into the formula (3), auxiliary convolution feature information is obtained. Then the auxiliary convolution feature information is used as new input convolution feature information, and the new input convolution feature information is inputted into a next second convolution pooling unit, circularly and continuously, until feature information outputted by the last second convolution pooling unit is used as the region convolution feature information $T_{reg}$ of the target image.

Figure 6:
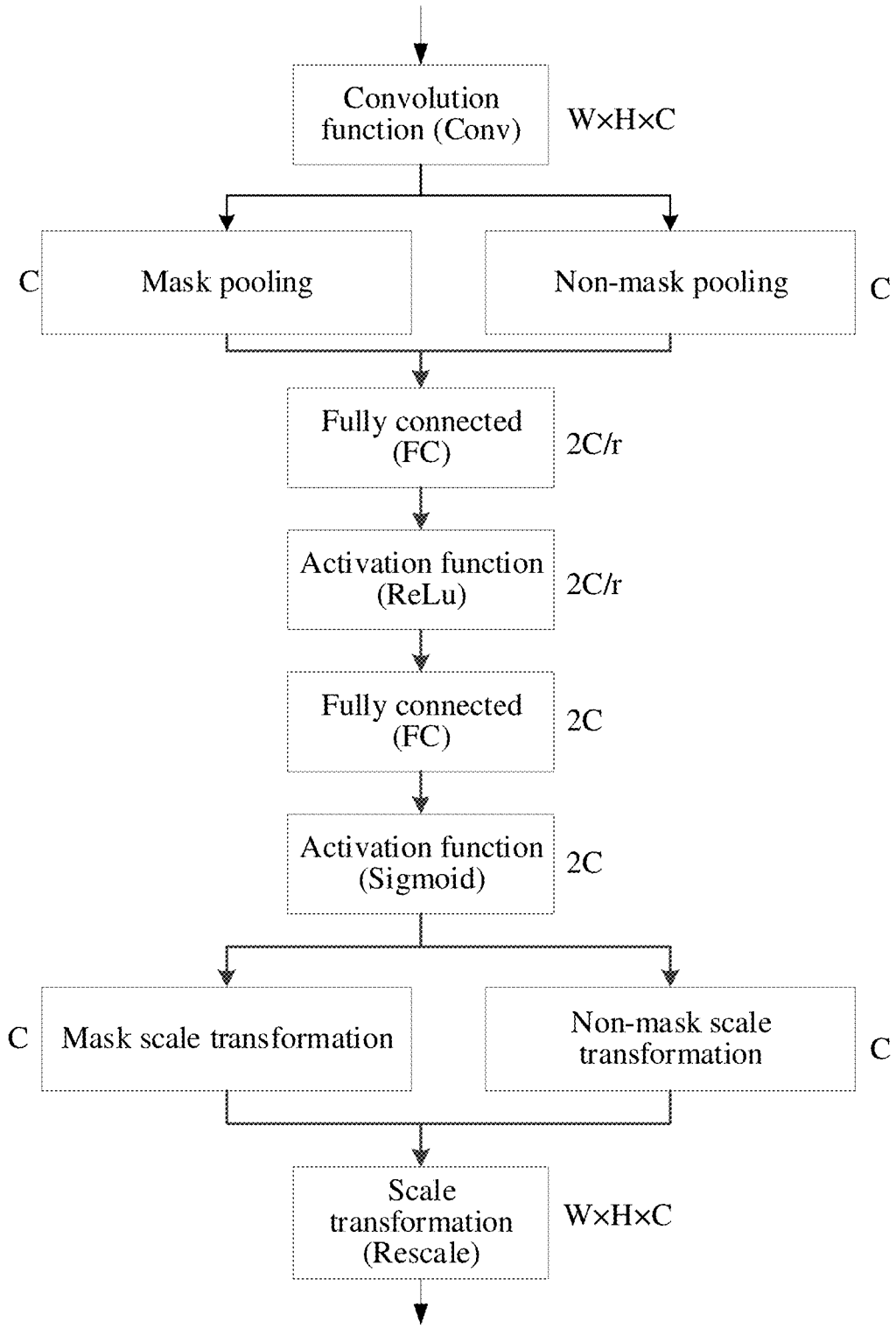
FIG. 6 is a schematic diagram of a second convolution pooling unit according to an embodiment of this application.

FIG. 6 is a schematic diagram of a second convolution pooling unit according to an embodiment of this application.

The second convolution pooling unit may be also referred to as a dependent convolution unit (ROI-SE Block), and the dependent convolution unit has the following features: a size of input data=a size of output data, and the size herein refers to a size of a feature map and a quantity of channels.

As shown in FIG. 6, it is assumed that a data size of the dependent convolution unit is W×H×C, that is, a quantity of channels is C and a size of a feature map is W×H. A convolution operation is performed on input data based on a convolution function in the dependent convolution unit. The convolution operation does not change a size of the input data, and a size of output data after the convolution operation is still W×H×C.

The downsampled mask and the output data with a size of W×H×C after the convolution operation are substituted into the formula (2) to obtain a pooling vector with a size of 1×1×2C. It may be seen from the formula (2) that, the pooling vector is formed by combining two vectors with sizes of 1×1×C, and the two vectors are a vector obtained by performing pooling on the downsampled mask and a vector obtained by performing non-mask pooling on the output data with the size of W×H×C after the convolution operation.

The pooling vector with a size of 1×1×2C is converted in nonlinear into an auxiliary vector based on the FC function and the activation function in the dependent convolution unit, and a size of the auxiliary vector may be 1×1×2C/r. Then the auxiliary vector with a size of 1×1×2C/r is converted in nonlinear into a target vector based on the FC function and the activation function in the dependent convolution unit, and a size of the target vector may be 1×1×2C.

Similarly, the target vector may be considered as a vector formed by combining two vectors, and sizes of the two vectors are both 1×1×C.

The downsampled mask and the target vector are substituted into the formula (3) to obtain output data of the dependent convolution unit, and a size of the output data is also W×H×C. A calculation process of the formula (3) may correspond to mask scale transformation, non-mask scale transformation, and scale transformation in FIG. 6.

The terminal device performs deconvolution on the region convolution feature information $T_{reg}$ outputted by the convolution pooling layer to obtain target convolution feature information $T_{out}$ (a size thereof may be A1×B1, T). An objective of the deconvolution is to increase a size of a feature map of the region convolution feature information, to enable a size of a feature map of the target convolution feature information $T_{out}$ after the deconvolution to be the same as a size of the target image $I_s$(A1×B1).

The terminal device performs full connection on the target convolution feature information $T_{out}$. The full connection is to calculate an average value of feature maps of a plurality of channels at the same position, to output a mask of a size of A1×B1, which is referred to as a to-be-updated mask. A size of the to-be-updated mask is the same as the size of the original mask.

The terminal device may directly use the to-be-updated mask as a new original mask.

The terminal device may alternatively adjust a value of a unit to-be-updated mask less than or equal to a mask threshold (the mask threshold may be 0.5) in the to-be-updated mask to a first numerical value, and the first numerical value may be 0; and adjust a value of a unit to-be-updated mask greater than the mask threshold in the to-be-updated mask to a second numerical value. The second numerical value may be 1, and in this case, a binary mask is obtained. A numerical value in the binary mask can only be the first numerical value or the second numerical value.

Adjusting a numerical value of the to-be-updated mask is to increase a difference between a target image region (the target image region is an image region of the target object in the target image) and a non-target image region. The terminal device then uses the binary mask as a new original mask.

So far, one update on the original mask is completed. Then the foregoing processes are performed again, that is, the new original mask is inputted into the first unit model for downsampling to obtain a new downsampled mask. The target image is inputted into the second unit model, and new region convolution feature information of the target image is extracted according to the new downsampled mask and the first convolution pooling unit and N second convolution pooling units in the second unit model, so as to update the original mask continuously and iteratively.

How to update the original mask when the second unit model includes a plurality of convolution pooling layers is described in the following:

If the second unit model includes a plurality of convolution pooling layers, correspondingly, the first unit model also includes a plurality of pooling layers. A quantity of convolution pooling layers included in the second unit model is equal to a quantity of pooling layers included in the first unit model.

The plurality of convolution pooling layers in the second unit model may be divided into a first convolution pooling layer and a second convolution pooling layer. A convolution pooling layer located at the top of the second unit model is the first convolution pooling layer, and the remaining convolution pooling layers are all the second convolution pooling layer. Correspondingly, the original mask includes a first original mask corresponding to the first convolution pooling layer and a second original mask corresponding to each second convolution pooling layer. It may be understood that the first original mask is generated by a first pooling layer in the first unit model, and the second original mask is generated by a second pooling layer in the first unit model.

The target image and the first original mask are inputted into the first convolution pooling layer, and convolution and pooling are performed on the target image to generate first convolution feature information.

In this case, whether there is only one second convolution pooling layer is detected.

If there is only one second convolution pooling layer in this case (correspondingly, there is only one second original mask in this case), the first convolution feature information and the second original mask are inputted into the second convolution pooling layer, and convolution and pooling are performed on the first convolution feature information to obtain the region convolution feature information of the target image.

If there is not only one second convolution pooling layer in this case (correspondingly, there is not only one second original mask in this case), the second convolution pooling layer adjacent to the current first convolution pooling layer is used as a new first convolution pooling layer, the first convolution feature information is used as the target image, and the second original mask adjacent to the first original mask is used as a new first original mask. The new target image and the new first original mask are inputted into the new first convolution pooling layer, and convolution and pooling are performed on the new target image to generate new first convolution feature information. In this case, whether there is only one second convolution pooling layer is detected. If there is only one second convolution pooling layer, the new first convolution feature information and the remaining one second original mask are inputted into the second convolution pooling layer, and convolution and pooling are performed on the new first convolution feature information to obtain the region convolution feature information of the target image. If there is not only one second convolution pooling layer, the second convolution pooling layer adjacent to the current first convolution pooling layer is used as a new first convolution pooling layer, the newly generated first convolution feature information is used as a new target image, and the second original mask adjacent to the current first original mask is used as a new first original mask, circularly and continuously, until all the second convolution pooling layers are in the operation, and the last second convolution pooling layer outputs the region convolution feature information of the target image.

That is, a plurality of pieces of first convolution feature information and one piece of region convolution feature information are generated according to a plurality of convolution pooling layers of the second unit model. A quantity of the pieces of the first convolution feature information+a quantity of pieces of the region convolution feature information=a quantity of convolution pooling layers included in the second unit model.

Then, deconvolution is performed on the region convolution feature information outputted finally to obtain third convolution feature information. A size of a feature map of the third convolution feature information is the same as a size of a feature map of adjacent first convolution feature information, but a quantity of channels of the third convolution feature information may be different from a quantity of channels of the adjacent first convolution feature information. A convolution pooling layer corresponding to the adjacent first convolution feature information may be adjacent to a convolution pooling layer corresponding to the current region convolution feature information.

In addition to the adjacent first convolution feature information, whether there is first convolution feature information on which a superimposing operation (the superimposing operation herein refers to superimposing between the first convolution feature information and the third convolution feature information) is not performed currently is detected. If there is no first convolution feature information on which a superimposing operation is not performed, the third convolution feature information and the adjacent first convolution feature information are superimposed on a dimension of a quantity of channels, and a convolution operation is performed on the superimposed convolution feature information to obtain target convolution feature information. For example, if a size of the third convolution feature information is 50×50×100, a size of the adjacent first convolution feature information is 50×50×140, a size of the superimposed convolution feature information is 50×50×240.

If there is first convolution feature information on which a superimposing operation is not performed in addition to the adjacent first convolution feature information, superimposing and convolution operations are performed on the third convolution feature information and the adjacent first convolution feature information on a dimension of a quantity of channels to obtain reference convolution feature information. The obtained reference convolution feature information is used as new region convolution feature information, and first convolution feature information corresponding to a convolution pooling layer adjacent to a convolution pooling layer corresponding to the new region convolution feature information is used as new adjacent first convolution feature information.

Then deconvolution is performed on the new region convolution feature information to obtain new third convolution feature information. Certainly, a size of a feature map of the new third convolution feature information is also equal to a size of a feature map of the new adjacent first convolution feature information.

Then, in addition to the adjacent first convolution feature information, whether there is first convolution feature information on which a superimposing operation is not performed currently is detected. If there is no first convolution feature information on which a superimposing operation is not performed, superimposing and convolution operations are performed on the new third convolution feature information and the new adjacent first convolution feature information on a dimension of a quantity of channels to obtain target convolution feature information.

If there is first convolution feature information on which a superimposing operation is not performed in addition to the adjacent first convolution feature information, superimposing and convolution operations are performed on the new third convolution feature information and the new adjacent first convolution feature information on a dimension of a quantity of channels to obtain new reference convolution feature information.

Continuous iterations are performed until all the first convolution feature information is in the superimposing operation, and target convolution feature information is outputted finally.

After the target convolution feature information is obtained, a deconvolution operation is performed on the target convolution feature information again to obtain deconvolution feature information. A size of a feature map of the deconvolution feature information is the same as the size of the target image.

Then full connection is performed on the deconvolution feature information, and the full connection may be to calculate an average value of feature maps of a plurality of channels at the same position, to output a to-be-updated mask. Then the to-be-updated mask is converted into a binary mask (a value of the binary mask can only be the first numerical value or the second numerical value), and then the binary mask is used as a new original mask.

So far, one iterative update on the original mask is completed.

Then the foregoing processes are performed again, that is, the new original mask is inputted into the first unit model for downsampling based on a plurality of pooling layers to obtain a new downsampled mask. The target image is inputted into the second unit model, and new region convolution feature information of the target image is extracted according to the new downsampled mask and the plurality of convolution pooling layers in the second unit model, so as to update the original mask continuously and iteratively.

Similarly, each convolution pooling layer in the second unit model includes one first convolution pooling unit and N second convolution pooling units, N being an integer greater than 0. A specific process of generating first convolution feature information based on each convolution pooling layer and outputting region convolution feature information of the target image based on the last convolution pooling layer located at the bottom layer may refer to the foregoing descriptions. That is, when the second unit model only includes one convolution pooling layer, how does the convolution pooling layer determine region convolution feature information. Certainly, in the foregoing description, when the second unit model only includes one convolution pooling layer, the region convolution feature information is directly outputted, and if the second unit model includes a plurality of convolution pooling layers, a plurality of pieces of first convolution feature information are outputted during the process, and only the last convolution pooling layer outputs the region convolution feature information. Although the input data is different, calculation processes related to the convolution pooling layer are all the same.

Step S104: Determine, in a case that an updated original mask satisfies an error convergence condition, a target image region of the target object in the target image according to the updated original mask.

Specifically, it may be learned from the foregoing descriptions that, the essence of iteratively updating an original mask each time is to generate a new binary mask, and using the new binary mask as a new original mask to be inputted into the second unit model. However, during the iterative updating process, the first unit model, the second unit model, and the target image are all unchanged, and only the original mask is changed.

The terminal device obtains an update count threshold. If a quantity of times of updating an original mask reaches the update count threshold, it indicates that the last updated original mask satisfies an error convergence condition, and the terminal device may use the last updated original mask as a target mask (for example, the target mask $20g$ in the embodiment corresponding to FIG. $2a$ and FIG. $2b$).

Alternatively, the terminal device calculates an error between an original mask before the updating and an original mask after the updating, and detects whether the error is less than a preset error threshold. If the error is less than the preset error threshold, it indicates that the updated original mask satisfies the error convergence condition, and in this case, the terminal device may use the updated original mask as a target mask. If the error is not less than the preset error threshold, it indicates that the updated original mask does not satisfy the error convergence condition, and the original mask needs to be updated continuously and iteratively, until the updated original mask satisfies the error convergence condition.

How to calculate an error between an original mask before the updating and an original mask after the updating is described in the following:

An original mask before the updating is mask1, an original mask after the updating is mask2, a target image is $I_s$, and a first error l1 may be determined according to the following formula (4):

$$l1 = \left| \frac{I * mask1}{\text{sum}(mask1)} - \frac{I * mask2}{\text{sum}(mask2)} \right| \quad (4)$$

|•| represents an element addition in a matrix.

An original mask before the updating is mask1, an original mask after the updating is mask2, accordingly, a second error l2 may be determined according to the formula (5):

$$l2 = \frac{2|mask1 \cap mask2|}{|mask1| + |mask2|} \quad (5)$$

|mask1∩mask2| represents performing dot product on the original mask mask1 before the updating and the original mask mask2 after the updating and then adding elements in the matrix.

The first error l1 and the second error l2 are added to obtain an error l between the original mask before the updating and the original mask after the updating:

$$l = l1 + l2 \qquad (6)$$

So far, the terminal device determines the target mask, and it may be learned from the foregoing that a value of a unit target mask in the target mask can only be a first numerical value less than the mask threshold or a second numerical value greater than the mask threshold. A size of the target mask is the same as a size of the target image, and unit masks of the target mask are in a one-to-one correspondence with pixels of the target image.

In various embodiments, a unit target mask may be referred as a target mask-unit.

The meaning of the target mask is that: if the value of the unit target mask is the first numerical value, it indicates that an attribute of a pixel corresponding to the unit target mask is a background attribute. If the value of the unit target mask is the second numerical value, it indicates that an attribute of a pixel corresponding to the unit target mask is a target object attribute corresponding to the target object.

For example, if the target mask is:

$$\begin{vmatrix} 0 & 1 \\ 1 & 0 \end{vmatrix},$$

the target mask includes 4 unit target masks. If the target object is a lesion object, it indicates that an attribute of the first pixel (a pixel at an upper left corner) of the target image is a background attribute, an attribute of the second pixel and the third pixel is a lesion object attribute, and an attribute of the fourth pixel (a pixel at a lower right corner) is the background attribute, that is, the first pixel and the fourth pixel are background pixels, and the second pixel and the third pixel are lesion object pixels.

In other words, a category of each pixel of the target object may be determined by using the target mask.

In the target mask, the terminal device determines location information of a unit target mask greater than the mask threshold. In the target image, an image region corresponding to the location information is used as a region of the target object in the target image, which is referred to as a target image region (for example, the image region of the dog in the embodiment corresponding to FIG. 2a and FIG. 2b).

If the target image is a biological tissue image and the target object is a lesion object, the target image region including the lesion object is a lesion image region.

The terminal device may identify the target image region in the target image, for example, identify a border of the target image region by using a dotted line, highlight the target image region, or the like.

There may also be one or more target objects, and if there is one target object (which is a two-category problem), there is only one corresponding original mask and target mask. Each unit target mask in the target mask may represent that an attribute of a corresponding pixel can only be a background attribute or a target object attribute.

If there are a plurality of target objects (which is a multi-category problem), there may also be a plurality of corresponding original masks and outputted target masks. Each unit target mask in each target mask may represent a probability in which a corresponding pixel belongs to a $k^{th}$ target object attribute. Certainly, if one pixel does not belong to any target object attribute, the pixel belongs to the background attribute.

Figure 7:
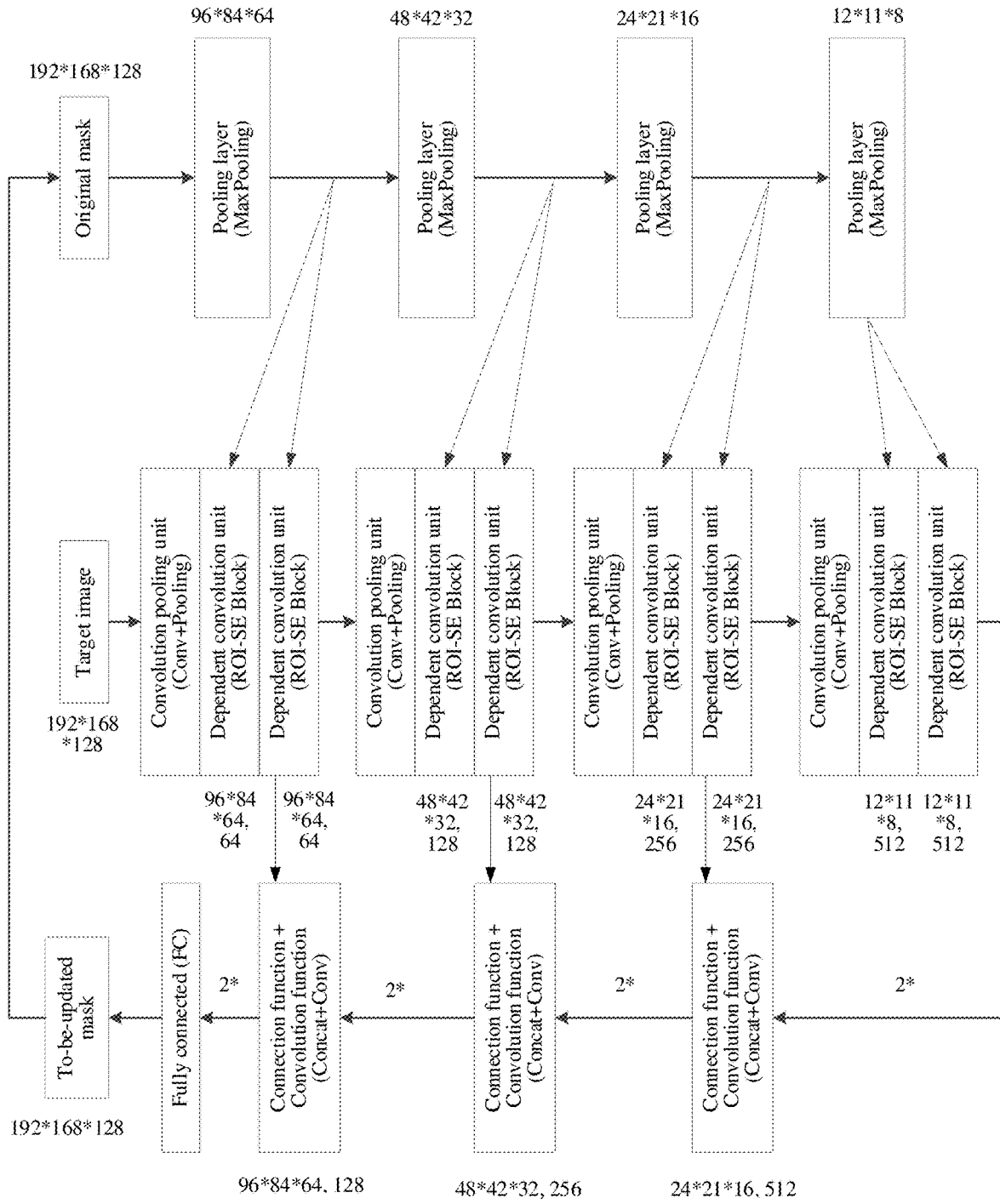
FIG. 7 is an architectural diagram of a model of an image processing method according to an embodiment of this application.

FIG. 7 is an architectural diagram of a model of an image processing method according to an embodiment of this application. An example in which a first unit model includes 4 pooling layers and a second unit model includes 4 convolution pooling layers is used for description.

A size of a target image is 192*168*128, and it indicates that the target image is a three-dimensional image. Correspondingly, an original mask is an all-0 three-dimensional image with a size of 192*168*128. The original mask is inputted into a pooling layer, and max pooling is performed on the original mask to obtain a downsampled mask 1 with a size of 96*84*64, a downsampled mask 2 with a size of 48*42*32, a downsampled mask 3 with a size of 24*21*16, and a downsampled mask 4 with a size of 12*11*8.

The target image is inputted into a convolution pooling layer (each convolution pooling layer includes 1 convolution pooling unit and 2 dependent convolution units, which correspond to the foregoing 1 first convolution pooling unit and 2 second convolution pooling units), feature information of the target image is extracted to separately obtain first convolution feature information 1 with a size of 96*84*64, 64, first convolution feature information 2 with a size of 48*42*32, 128, first convolution feature information 3 with a size of 24*21*16, 256, and region convolution feature information 4 with a size of 12*11*8, 512. In the foregoing 4 pieces of convolution feature information, a*b*c before the comma represents a size of a feature map, and a numerical value after the comma represents a quantity of channels.

It may be seen from FIG. 7 that, in each convolution pooling layer, a size of output data of the convolution pooling unit is equal to a size of output data of the dependent convolution unit.

Deconvolution is performed on the region convolution feature information 4 with a size of 12*11*8, 512 to obtain deconvolution feature information 3 with a size of 24*21*16, 512. Superimposing and convolution are performed on the deconvolution feature information 3 and the first convolution feature information 3 with a size of 24*21*16, 256 to obtain superimposing convolution feature information 3 with a size of 24*21*16, 512.

Deconvolution is performed on the superimposing convolution feature information 3 with a size of 24*21*16, 512 to obtain deconvolution feature information 2 with a size of 48*42*32, 512. Superimposing and convolution are performed on the deconvolution feature information 2 and the first convolution feature information 2 with a size of 48*42*32, 128 to obtain superimposing convolution feature information 2 with a size of 48*42*32, 256.

Deconvolution is performed on the superimposing convolution feature information 2 with a size of 48*42*32, 256 to obtain deconvolution feature information 1 with a size of 96*84*64, 256. Superimposing and convolution are performed on the deconvolution feature information 1 and the first convolution feature information 1 with a size of 96*84*64, 64 to obtain target convolution feature information with a size of 96*84*64, 128.

Deconvolution is performed on the target convolution feature information with a size of 96*84*64, 128 to obtain deconvolution feature information with a size of 192*168*128, 128.

An average value (that is, full connection) of the deconvolution feature information at each channel is calculated to obtain a to-be-updated mask with a size of 192*168*128.

The to-be-updated mask with a size of 192*168*128 is used as a new original mask, and the updating continues to be performed. When the updating stops, a region of the target object in the target image may be determined according to the newest original mask.

Figure 8:
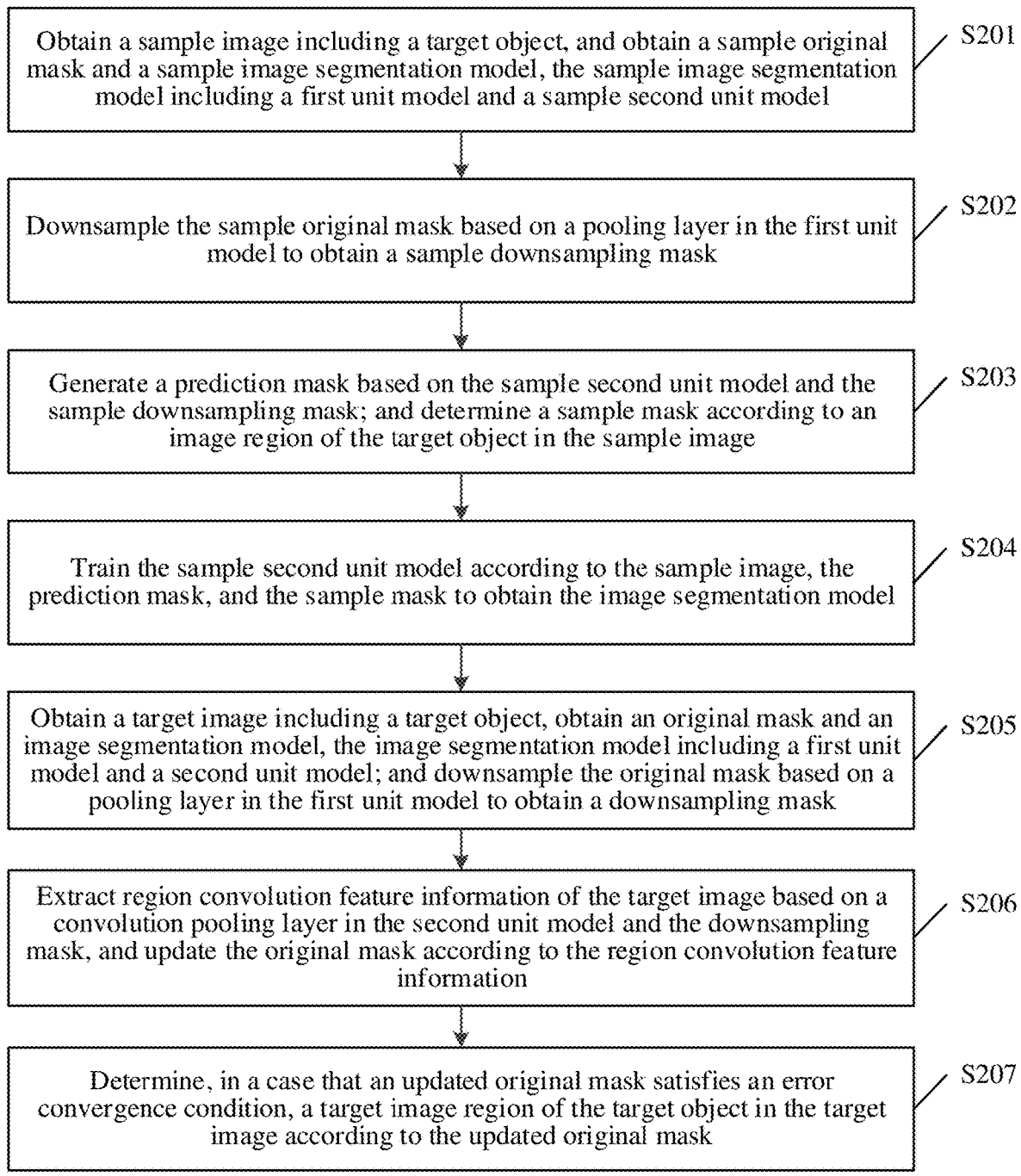
FIG. 8 is a schematic flowchart of an image processing method according to an embodiment of this application.

FIG. 8 is a schematic flowchart of an image processing method according to an embodiment of this application, and the method may be performed by a computer device shown in FIG. 11. The image processing method includes the following steps:

Step S201: Obtain a sample image including the target object, and obtain a sample original mask and a sample image segmentation model, the sample image segmentation model including the first unit model and a sample second unit model.

How to train an image segmentation model is described in the following. It may be learned from the foregoing that, the image segmentation model includes a first unit model and a second unit model, and the first unit model only includes a pooling layer. Therefore, the first unit model does not need to train a model variable parameter, that is, the first unit model does not need to be trained, and only the second unit model needs to be trained.

The terminal device obtains a sample image including the target object, and obtains a sample original mask and a sample image segmentation model. A value of each unit sample original mask in the sample original mask may be a first numerical value, that is, a numerical value 0.

The sample image segmentation model includes the first unit model and a sample second unit model.

Step S202: Downsample the sample original mask based on a pooling layer in the first unit model to obtain a sample downsampling mask.

In various embodiments, a sample downsampling mask may be referred as a sample downsampled mask.

Specifically, similar to the use of the first unit model, the sample original mask is downsampled based on the pooling layer in the first unit model to obtain the sample downsampled mask.

Step S203: Generate a prediction mask based on the sample second unit model and the sample downsampled mask, and determine a sample mask according to an image region of the target object in the sample image.

Specifically, the sample image and the sample downsampled mask are inputted into the sample second unit model based on forward propagation to generate a prediction mask $mask_{pre}$. A specific process of generating the prediction mask $mask_{pre}$ based on forward propagation is the same as the process of generating the target mask.

A real image region of the target object in the sample image is determined, and a sample mask $mask_t$ is generated according to the image region, that is, the sample mask is a real mask determined by a real region.

Step S204: Train the sample second unit model according to the sample image, the prediction mask, and the sample mask to obtain the image segmentation model.

Specifically, the prediction mask $mask_{pre}$, the sample image $I_t$, and the sample mask $mask_t$ are substituted into the following formula (7) to generate a brightness loss intensity $\leftrightarrows$ loss:

$$\text{intensity loss} = \left| \frac{I_t * mask_{pre}}{\text{sum}(mask_{pre})} - \frac{I_t * mask_t}{\text{sum}(mask_t)} \right| \tag{7}$$

The prediction mask $mask_{pre}$ and the sample mask $mask_t$ are substituted into the following formula (8) to generate a segmentation loss dice loss:

$$\text{dice loss} = \frac{2|mask_{pre} \cap mask_t|}{|mask_{pre}| + |mask_t|} \tag{8}$$

The brightness loss intensity $\leftrightarrows$ loss and the segmentation loss dice loss are combined into a target loss target loss:

$$\text{target loss} = \text{dice loss} + \text{intensity loss} \tag{9}$$

A model variable parameter in the sample second unit model is adjusted according to backward propagation and based on a gradient descent rule and the target loss to obtain a target parameter, the target parameter being a value of the model variable parameter in the sample second unit model when the target loss is minimized. The model variable parameter of the sample second unit model is replaced with the target parameter, and so far, one iterative updating on the model variable parameter of the sample second unit model is completed.

Then, a next sample image including a target object is extracted, and the sample second unit model is updated by using the foregoing manners (certainly, the sample second unit model at this time is a sample second unit model that has been updated once).

When update counts reach a preset training count threshold, or a difference quantity between the model variable parameter of the sample second unit model before the updating and the model variable parameter of the sample second unit model after the updating is within a preset range, it indicates that the sample second unit model has been trained. In this case, the terminal device uses the trained sample second unit model as the second unit model.

The terminal device combines the trained second unit model and the first unit model into the image segmentation model.

Step S205: Obtain a target image including a target object, and obtain an original mask and an image segmentation model, the image segmentation model including a first unit model and a second unit model; and downsample the original mask based on a pooling layer in the first unit model to obtain a downsampling mask.

In various embodiments, a downsampling mask may be referred as a downsampled mask.

Step S206: Extract region convolution feature information of the target image based on a convolution pooling layer in the second unit model and the downsampled mask, and update the original mask according to the region convolution feature information.

Step S207: Determine, in a case that an updated original mask satisfies an error convergence condition, a target image region of the target object in the target image according to the updated original mask.

For a specific implementation process of step S205 to step S207, reference may be made to step S101 to step S104 in the embodiment corresponding to FIG. 3.

Figure 9A:
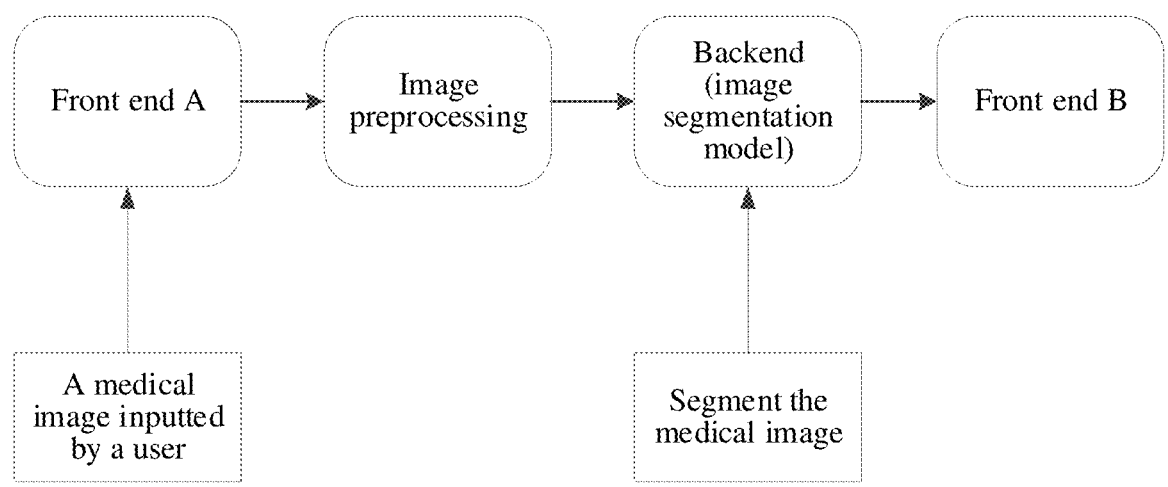
FIG. 9a is a diagram of functional modules of image processing according to an embodiment of this application.

FIG. 9a is a diagram of functional modules of image processing according to an embodiment of this application. As shown in FIG. 9a, when a target image is a medical image and a target object is a lesion object, a front end A may receive a to-be-segmented medical image inputted by a user, and preprocess the medical image based on an image preprocessing rule (for example, image normalization, image translation, and/or image rotation) to obtain a preprocessed image. The preprocessed image is transmitted into a backend, and the backend stores a trained image segmentation model. A region of the lesion object in the medical image is determined based on the image segmentation model, and the backend may segment the recognized region from the medical image to obtain a lesion image. The backend transmits the lesion image to a front end B (the front end B and the front end A may be the same front end), and the front end B may display the lesion image or further analyze the lesion image.

In various embodiments in the present disclosure, a unit may refer to a software unit, a hardware unit, or a combination thereof. A software unit may include a computer program or part of the computer program that has a predefined function and works together with other related parts to achieve a predefined goal, such as those functions described in this disclosure. A hardware unit may be implemented using processing circuitry and/or memory configured to perform the functions described in this disclosure. Each unit can be implemented using one or more processors (or processors and memory). Likewise, a processor (or processors and memory) can be used to implement one or more units. Moreover, each unit can be part of an overall unit that includes the functionalities of the unit. The description here also applies to the term unit and other equivalent terms.

In various embodiments in the present disclosure, a module may refer to a software module, a hardware module, or a combination thereof. A software module may include a computer program or part of the computer program that has a predefined function and works together with other related parts to achieve a predefined goal, such as those functions described in this disclosure. A hardware module may be implemented using processing circuitry and/or memory configured to perform the functions described in this disclosure. Each module can be implemented using one or more processors (or processors and memory). Likewise, a processor (or processors and memory) can be used to implement one or more modules. Moreover, each module can be part of an overall module that includes the functionalities of the module. The description here also applies to the term module and other equivalent terms.

Figure 9B:
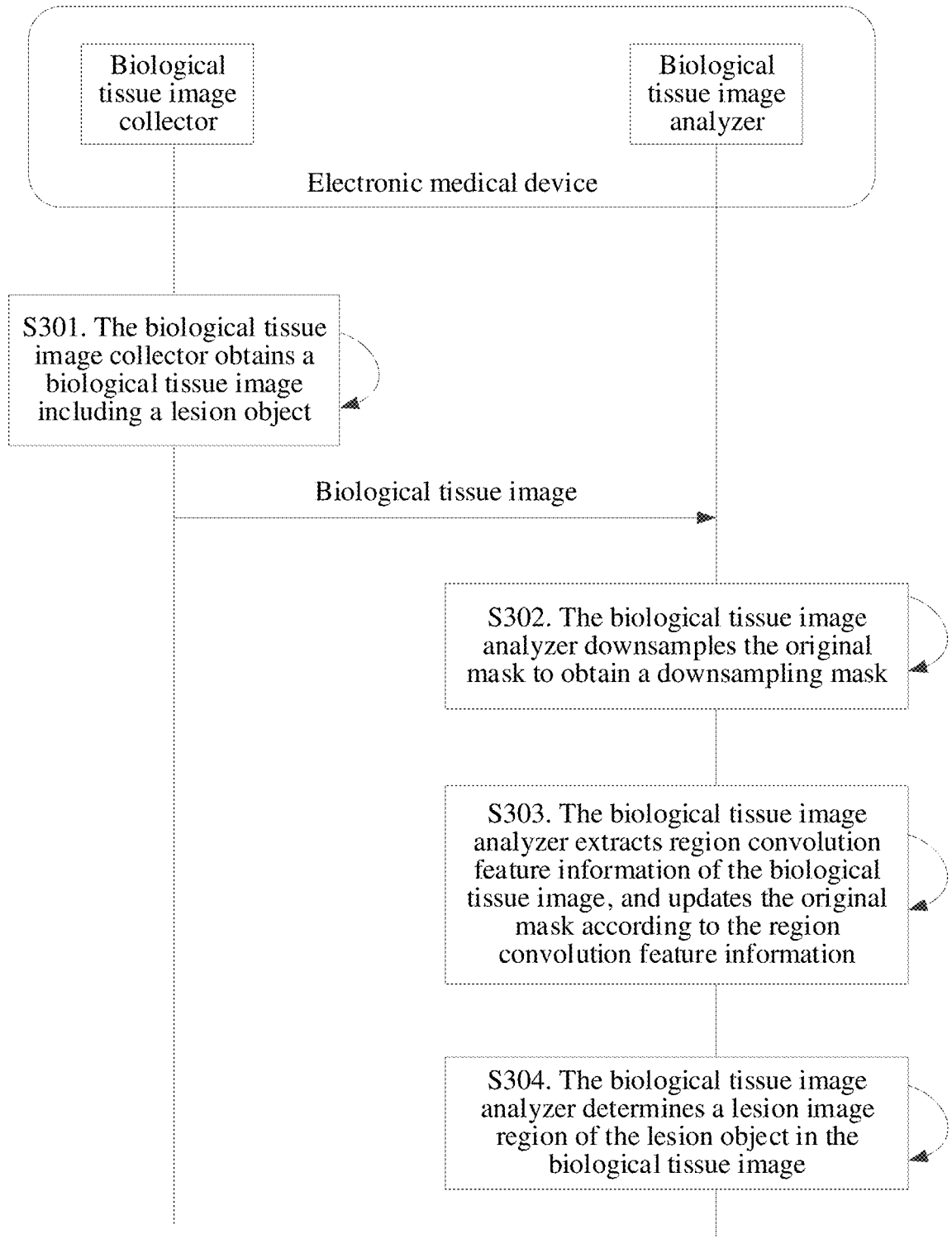
FIG. 9b is a schematic structural diagram of an electronic medical device according to an embodiment of this application.

FIG. 9b is a schematic structural diagram of an electronic medical device according to an embodiment of this application. The electronic medical device may be the terminal device in the embodiments corresponding to FIG. 1a to FIG. 9a. The electronic medical device may include a biological tissue image collector and a biological tissue image analyzer. The electronic medical device may collect a medical image and analyze the medical image. A specific process includes the following steps:

Step S301: The biological tissue image collector obtains a biological tissue image including a lesion object.

Specifically, the biological tissue image collector obtains a biological tissue image including a lesion object. If the biological tissue image is a magnetic resonance imaging (MRI) image, the biological tissue image collector may be an MRI machine. If the biological tissue image is a computed tomography (CT) image, the biological tissue image collector may be a CT machine. If the biological tissue image is a breast mammography image, the biological tissue image collector may be a mammography machine.

Step S302: The biological tissue image analyzer obtains an original mask and an image segmentation model, the image segmentation model including a first unit model and a second unit model; and the biological tissue image analyzer downsamples the original mask based on a pooling layer in the first unit model to obtain a downsampling mask.

In various embodiments, a downsampling mask may be referred as a downsampled mask.

Specifically, the biological tissue image analyzer obtains a trained image segmentation model and an original mask having the same size as the biological tissue image.

The biological tissue image analyzer inputs the original mask into the first unit model, and performs a pooling operation on the original mask based on a pooling layer in the first unit model to obtain a downsampled mask. The pooling operation herein may be a max pooling operation or an average pooling operation.

A specific process in which the biological tissue image analyzer generates the downsampled mask based on the first unit model may refer to step S102 in the embodiment corresponding to FIG. 3.

Step S303: The biological tissue image analyzer extracts region convolution feature information of the biological tissue image based on a convolution pooling layer in the second unit model and the downsampled mask, and updates the original mask according to the region convolution feature information.

Specifically, the biological tissue image analyzer inputs the downsampled mask and the biological tissue image into the second unit model, extracts region convolution feature information of the biological tissue image based on a convolution pooling layer in the second unit model, generates a to-be-updated mask according to the region convolution feature information, and obtains a binary mask after binarization is performed on the to-be-updated mask. The to-be-updated mask, the binary mask, and the original mask have the same size. The biological tissue image analyzer uses the generated binary mask as a new original mask to be inputted into the first unit model again, to update the original mask continuously and iteratively.

A specific process in which the biological tissue image analyzer updates the original mask based on the second unit model may refer to step S103 in the embodiment corresponding to FIG. 3.

Step S304: The biological tissue image analyzer determines, in a case that an updated original mask satisfies an error convergence condition, a lesion image region of the lesion object in the biological tissue image according to the updated original mask.

Specifically, if a quantity of times of updating the original mask reaches an update count threshold, or if an error between the original mask before the updating and the original mask after the updating is less than a preset error threshold, the biological tissue image analyzer uses the original mask after the updating as the target mask. In the target mask, the biological tissue image analyzer determines location information of a unit target mask greater than the mask threshold. In the biological tissue image, the biological tissue image analyzer uses an image region corresponding to the location information as a region of the lesion object in the biological tissue image, which is referred to as a lesion image region.

Subsequently, a biological tissue image display may identify the lesion image region in the biological tissue image, and display the biological tissue image on which the lesion image region is identified.

Figure 10:
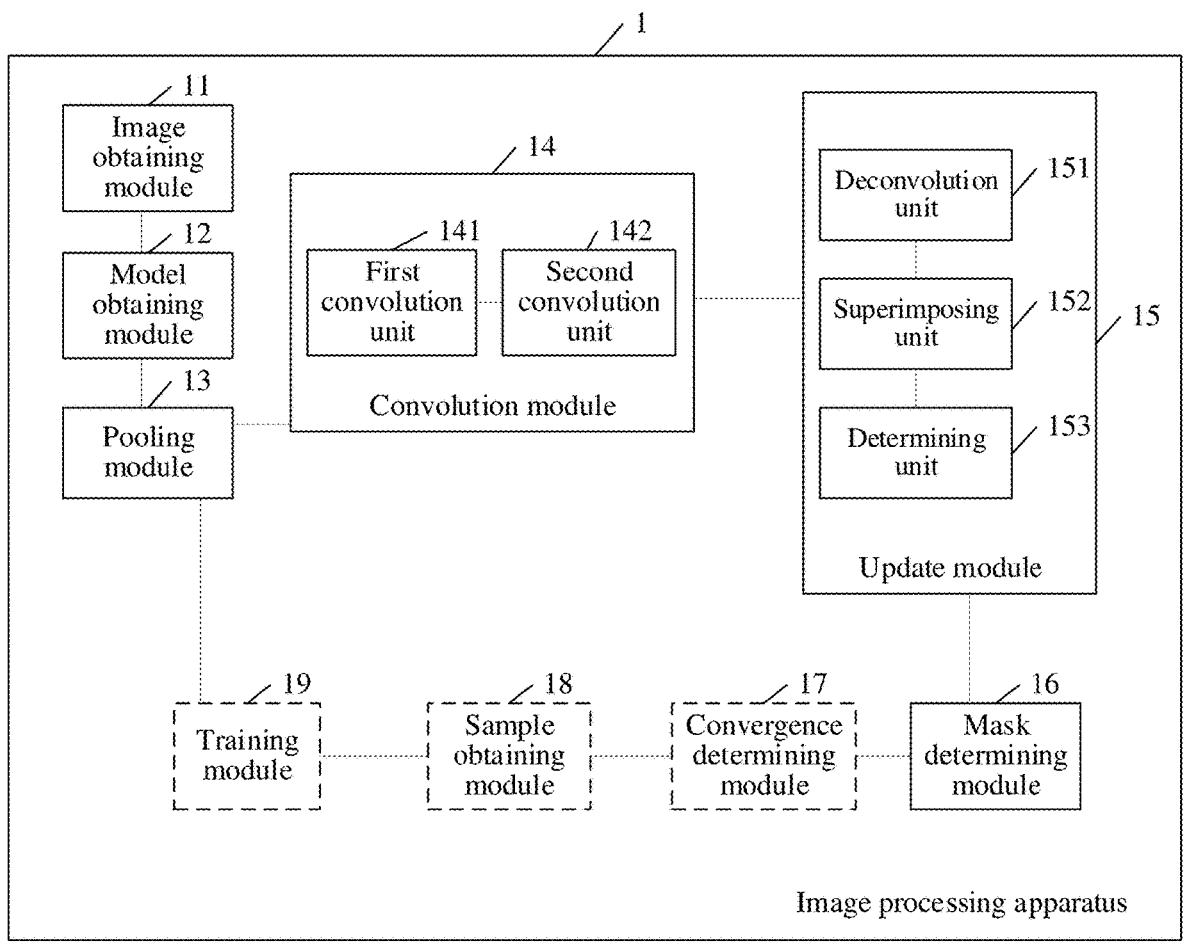
FIG. 10 is a schematic structural diagram of an image processing apparatus according to an embodiment of this application.

Further, FIG. 10 is a schematic structural diagram of an image processing apparatus according to an embodiment of this application. As shown in FIG. 10, an image processing apparatus 1 is applicable to the terminal device in the embodiments corresponding to FIG. 1 to FIG. 9. The image processing apparatus 1 may include: an image obtaining module 11, a model obtaining module 12, a pooling module 13, a convolution module 14, an update module 15, and a mask determining module 16.

The image obtaining module 11 is configured to obtain a target image including a target object.

The model obtaining module 12 is configured to obtain an original mask and an image segmentation model, the image segmentation model including a first unit model and a second unit model.

The pooling module 13 is configured to downsample the original mask based on a pooling layer in the first unit model to obtain a downsampled mask.

The convolution module 14 is configured to extract region convolution feature information of the target image based on a convolution pooling layer in the second unit model and the downsampled mask.

The update module 15 is configured to update the original mask according to the region convolution feature information.

The mask determining module 16 is configured to determine, in a case that an updated original mask satisfies an error convergence condition, a target image region of the target object in the target image according to the updated original mask.

The image obtaining module 11 is specifically configured to: obtain an original image including the target object; and perform image preprocessing on the original image based on an image preprocessing rule to obtain the target image, the image preprocessing rule including: image normalization, image translation, image rotation, image symmetry, and image scaling.

The mask determining module 16 is specifically configured to: determine the updated original mask as a target mask; determine location information of a unit target mask greater than a mask threshold in the target mask; and use an image region corresponding to the location information in the target image as the target image region, the target mask including a plurality of unit target masks.

For a specific functional implementation of the image obtaining module 11, the model obtaining module 12, the pooling module 13, the convolution module 14, the update module 15, and the mask determining module 16, reference may be made to steps S101 to S104 in the foregoing embodiment corresponding to FIG. 3, and details are not described herein again.

Referring to FIG. 10, the convolution pooling layer in the second unit model includes a first convolution pooling layer and a second convolution pooling layer. The downsampled mask includes a first original mask corresponding to the first convolution pooling layer and a second original mask corresponding to the second convolution pooling layer.

The convolution module 14 may include: a first convolution unit 141 and a second convolution unit 142.

The first convolution unit 141 is configured to perform convolution and pooling on the target image based on the first convolution pooling layer and the first original mask to obtain first convolution feature information.

The second convolution unit 142 is configured to perform convolution and pooling on the first convolution feature information based on the second convolution pooling layer and the second original mask to obtain the region convolution feature information of the target image.

For a specific process of the first convolution unit 141 and the second convolution unit 142, reference may be made to step S103 in the foregoing embodiment corresponding to FIG. 3.

Referring to FIG. 10, the first convolution pooling layer includes a first convolution pooling unit and a second convolution pooling unit.

The first convolution unit 141 is specifically configured to: perform convolution and pooling on the target image based on a convolution function and a pooling function corresponding to the first convolution pooling unit to obtain input convolution feature information; encode the input convolution feature information based on a convolution function corresponding to the second convolution pooling unit to generate second convolution feature information; perform pooling on feature maps of a plurality of channels of the second convolution feature information according to the first original mask separately to determine a pooling vector; convert the pooling vector into a target vector based on an activation function corresponding to the second convolution pooling unit; and generate the first convolution feature information according to the target vector and the first original mask, the input convolution feature information, the first convolution feature information, and the second convolution feature information having the same size.

For a specific process of the first convolution unit 141, reference may be made to step S103 in the foregoing embodiment corresponding to FIG. 3.

Referring to FIG. 10, the update module 15 may include: a deconvolution unit 151, a superimposing unit 152, and a determining unit 153.

The deconvolution unit 151 is configured to perform deconvolution on the region convolution feature information to generate third convolution feature information.

The superimposing unit 152 is configured to: superimpose the third convolution feature information and the first convolution feature information into target convolution feature information; and perform deconvolution and full connection on the target convolution feature information to obtain a to-be-updated mask.

The determining unit 153 is configured to determine the to-be-updated mask as the original mask, the to-be-updated mask and the target image having the same size,
the to-be-updated mask including a plurality of unit to-be-updated masks.

The determining unit 153 is specifically configured to: adjust a value of a unit to-be-updated mask less than or equal to a mask threshold in the to-be-updated mask to a first numerical value; and adjust a value of a unit to-be-updated mask greater than the mask threshold in the to-be-updated mask to a second numerical value, to obtain the original mask.

For a specific process of the deconvolution unit 151, the superimposing unit 152, and the determining unit 153, reference may be made to step S103 in the foregoing embodiment corresponding to FIG. 3. Details are not repeated herein.

The image processing apparatus 1 may include: an image obtaining module 11, a model obtaining module 12, a pooling module 13, a convolution module 14, an update module 15, and a mask determining module 16; and may further include a convergence determining module 17.

The convergence determining module 17 is configured to determine, in a case that an error between the updated original mask and the original mask before the update is less than an error threshold, that the updated original mask satisfies the error convergence condition.

Alternatively, the convergence determining module 17 is further configured to determine, in a case that update counts reach an update count threshold, that the updated original mask satisfies the error convergence condition.

For a specific process of the convergence determining module 17, reference may be made to step S104 in the foregoing embodiment corresponding to FIG. 3. Details are not repeated herein.

Further referring to FIG. 10, the image processing apparatus 1 may include: an image obtaining module 11, a model obtaining module 12, a pooling module 13, a convolution module 14, an update module 15, and a mask determining module 16; and may further include a sample obtaining module 18 and a training module 19.

The sample obtaining module 18 is configured to obtain a sample image including the target object, and obtain a sample original mask and a sample image segmentation model, the sample image segmentation model including the first unit model and a sample second unit model.

The sample obtaining module 18 is further configured to downsample the sample original mask based on a pooling layer in the first unit model to obtain a sample downsampled mask.

The sample obtaining module 18 is further configured to: generate a prediction mask based on the sample second unit model and the sample downsampled mask; and determine a sample mask according to an image region of the target object in the sample image.

The training module 19 is configured to train the sample second unit model according to the sample image, the prediction mask, and the sample mask to obtain the image segmentation model.

The training module 19 is specifically configured to: generate a brightness loss according to the sample image, the prediction mask, and the sample mask; generate a segmentation loss according to the prediction mask and the sample mask; combine the brightness loss and the segmentation loss into a target loss; determine a parameter value of a model variable parameter in the sample second unit model based on a gradient descent rule and the target loss, and update the model variable parameter in the sample second unit model according to the parameter value; and use, in a case that training counts reach a training count threshold, the sample second unit model with an updated model variable parameter as the second unit model, and combine the first unit model and the second unit model into the image segmentation model.

For a specific process of the sample obtaining module 18 and the training module 19, reference may be made to step S201 to step S204 in the foregoing embodiment corresponding to FIG. 8. Details are not repeated herein.

The target object is a lesion object, the target image is a biological tissue image; and the target image region is a lesion image region.

According to this application, a target image including a target object is obtained, and an original mask and an image segmentation model are obtained. Downsampling is performed on the original mask based on a first unit model in the image segmentation model to obtain a downsampled mask. Region convolution feature information of the target image is extracted based on a second unit model in the image segmentation model and the downsampled mask, and the original mask is updated according to the region convolution feature information, the original mask being updated continuously and iteratively. When an updated original mask satisfies a convergence condition, a region of the target object in the target image is determined according to the updated original mask. As can be seen from the above, compared with manual segmentation, an automatic segmentation of a region of a target object in an image can reduce the time of image segmentation and improve image segmentation efficiency.

Further, FIG. 11 is a schematic structural diagram of a computer device according to an embodiment of this application. The terminal device in the embodiments corresponding to FIG. 1 to FIG. 9 may be a computer device 1000. As shown in FIG. 11, the computer device 1000 may include: a user interface 1002, a processor 1004, an encoder 1006, and a memory 1008. A signal receiver 1016 is configured to receive or transmit data by using a cellular interface 1010, a Wi-Fi interface 1012, . . . , or an NFC interface 1014. The encoder 1006 encodes the received data into a data format processed by a computer. The memory 1008 stores a computer program, and the processor 1004 is configured to perform steps in any one of the method embodiments through the computer program. The memory 1008 may include a volatile memory (for example, a dynamic random access memory (DRAM)), and may further include a non-volatile memory (for example, a one-time programmable read-only memory (OTPROM)). In some examples, the memory 1008 may further include memories remotely disposed relative to the processor 1004, and these remote memories may be connected to the computer device 1000 through a network. The user interface 1002 may include: a keyboard 1018 and a display 1020.

In the computer device 1000 shown in FIG. 11, the processor 1004 may be configured to invoke the computer program stored in the memory 1008, to implement the following operations:

obtaining a target image including a target object, and obtaining an original mask and an image segmentation model, the image segmentation model including a first unit model and a second unit model;

downsampling the original mask based on a pooling layer in the first unit model to obtain a downsampled mask;

extracting region convolution feature information of the target image based on a convolution pooling layer in the second unit model and the downsampled mask, and updating the original mask according to the region convolution feature information; and determining, in a case that an updated original mask satisfies an error convergence condition, a target image region of the target object in the target image according to the updated original mask.

In an embodiment, the convolution pooling layer in the second unit model includes a first convolution pooling layer and a second convolution pooling layer. The downsampled mask includes a first original mask corresponding to the first convolution pooling layer and a second original mask corresponding to the second convolution pooling layer.

When extracting region convolution feature information of the target image based on a convolution pooling layer in the second unit model and the downsampled mask, the processor 1004 specifically performs the following operations:

performing convolution and pooling on the target image based on the first convolution pooling layer and the first original mask to obtain first convolution feature information; and performing convolution and pooling on the first convolution feature information based on the second convolution pooling layer and the second original mask to obtain the region convolution feature information of the target image.

In an embodiment, the first convolution pooling layer includes a first convolution pooling unit and a second convolution pooling unit.

When performing convolution and pooling on the target image based on the first convolution pooling layer and the first original mask to obtain first convolution feature information, the processor 1004 specifically performs the following operations:

performing convolution and pooling on the target image based on a convolution function and a pooling function corresponding to the first convolution pooling unit to obtain input convolution feature information;

encoding the input convolution feature information based on a convolution function corresponding to the second convolution pooling unit to generate second convolution feature information;

performing pooling on feature maps of a plurality of channels of the second convolution feature information according to the first original mask separately to determine a pooling vector;

converting the pooling vector into a target vector based on an activation function corresponding to the second convolution pooling unit; and generating the first convolution feature information according to the target vector and the first original mask, the input convolution feature information, the first convolution feature information, and the second convolution feature information having the same size.

In an embodiment, when updating the original mask according to the region convolution feature information, the processor 1004 specifically performs the following operations:

performing deconvolution on the region convolution feature information to generate third convolution feature information;

superimposing the third convolution feature information and the first convolution feature information into target convolution feature information; and performing deconvolution and full connection on the target convolution feature information to obtain a to-be-updated mask, and determining the to-be-updated mask as the original mask, the to-be-updated mask and the target image having the same size.

In an embodiment, the to-be-updated mask includes a plurality of unit to-be-updated masks.

When determining the to-be-updated mask as the original mask, the processor 1004 specifically performs the following operations:

adjusting a value of a unit to-be-updated mask less than or equal to a mask threshold in the to-be-updated mask to a first numerical value; and adjusting a value of a unit to-be-updated mask greater than the mask threshold in the to-be-updated mask to a second numerical value, to obtain the original mask.

In an embodiment, when determining a target image region of the target object in the target image according to the updated original mask, the processor 1004 specifically performs the following operations:

determining the updated original mask as a target mask, the target mask including a plurality of unit target masks;

determining location information of a unit target mask greater than a mask threshold in the target mask; and using an image region corresponding to the location information in the target image as the target image region.

In an embodiment, when obtaining a target image including a target object, the processor 1004 specifically performs the following operations:

obtaining an original image including the target object; and performing image preprocessing on the original image based on an image preprocessing rule to obtain the target image, the image preprocessing rule including: image normalization, image translation, image rotation, image symmetry, and image scaling.

In an embodiment, the processor 1004 further performs the following operations:

determining, in a case that an error between the updated original mask and the original mask before the update is less than an error threshold, that the updated original mask satisfies the error convergence condition; or determining, in a case that update counts reach an update count threshold, that the updated original mask satisfies the error convergence condition.

In an embodiment, the processor 1004 further performs the following operations:

obtaining a sample image including the target object, and obtaining a sample original mask and a sample image segmentation model, the sample image segmentation model including the first unit model and a sample second unit model.

downsampling the sample original mask based on a pooling layer in the first unit model to obtain a sample downsampled mask;

generating a prediction mask based on the sample second unit model and the sample downsampled mask;

determining a sample mask according to an image region of the target object in the sample image; and training the sample second unit model according to the sample image, the prediction mask, and the sample mask to obtain the image segmentation model.

In an embodiment, when training the sample second unit model according to the sample image, the prediction mask, and the sample mask to obtain the image segmentation model, the processor 1004 specifically performs the following operations:

generating a brightness loss according to the sample image, the prediction mask, and the sample mask;

generating a segmentation loss according to the prediction mask and the sample mask;

combining the brightness loss and the segmentation loss into a target loss;

determining a parameter value of a model variable parameter in the sample second unit model based on a gradient descent rule and the target loss, and updating the model variable parameter in the sample second unit model according to the parameter value; and using, in a case that training counts reach a training count threshold, the sample second unit model with an updated model variable parameter as the second unit model, and combining the first unit model and the second unit model into the image segmentation model.

In an embodiment, the target object is a lesion object; the target image is a biological tissue image; and the target image region is a lesion image region.

It is to be understood that, the computer device 1000 described in this embodiment of this application may implement the descriptions of the image processing method in the embodiments corresponding to FIG. 1 to FIG. 9, or the descriptions of the image processing apparatus 1 in the embodiment corresponding to FIG. 10. Details are not described herein again. In addition, the description of beneficial effects of the same method is not described herein again.

According to an aspect of this application, a computer program product or a computer program is provided, the computer program product or the computer program including computer instructions, the computer instructions being stored in a computer-readable storage medium. The processor 1004 of the computer device 1000 shown in FIG. 11 reads the computer instructions from the computer-readable storage medium, and the processor 1004 executes the computer instructions, to cause the computer device 1000 to perform the image processing method in the method embodiments.

In addition, an embodiment of this application further provides a computer storage medium. The computer storage medium stores a computer program executed by the image processing apparatus 1 mentioned above, and the computer program includes program instructions. When executing the program instructions, the processor can implement the descriptions of the image processing method in the embodiments corresponding to FIG. 1 to FIG. 9. Therefore, details are not described herein again. In addition, the description of beneficial effects of the same method is not described herein again. For technical details that are not disclosed in the computer storage medium embodiments of this application, refer to the descriptions of the method embodiments of this application.

A person of ordinary skill in the art may understand that all or some of the procedures of the methods of the foregoing embodiments may be implemented by a computer program instructing relevant hardware. The program may be stored in a computer-readable storage medium. When the program is executed, the procedures of the foregoing method embodiments may be implemented. The foregoing storage medium may include a magnetic disc, an optical disc, a read-only memory (ROM), a random access memory (RAM), or the like.

What are disclosed above are merely examples of embodiments of this application, and certainly are not intended to limit the protection scope of this application. Therefore, equivalent variations made in accordance with the claims of this application shall fall within the scope of this application.

What is claimed is:

1. A method for determining a target image region of a target object in a target image, the method comprising:
    obtaining, by a device comprising a memory storing instructions and a processor in communication with the memory, an original mask and an image segmentation model, the image segmentation model comprising a first unit model and a second unit model;
    downsampling, by the device, the original mask based on a pooling layer in the first unit model to obtain a downsampled mask;
    extracting, by the device, region convolution feature information of a target image based on a convolution pooling layer in the second unit model and the downsampled mask;
    updating, by the device, the original mask according to the region convolution feature information; and
    in response to the updated original mask satisfying an error convergence condition, determining, by the device, a target image region of a target object in the target image according to the updated original mask,
    wherein the target object is a lesion object; the target image is a biological tissue image; and the target image region is a lesion image region.

2. The method according to claim 1, further comprising:
    obtaining a sample image comprising the target object, and obtaining a sample original mask and a sample image segmentation model, the sample image segmentation model comprising the first unit model and a sample second unit model;
    downsampling the sample original mask based on the pooling layer in the first unit model to obtain a sample downsampled mask; and
    generating a prediction mask based on the sample second unit model and the sample downsampled mask.

3. The method according to claim 2, further comprising:
    determining a sample mask according to an image region of the target object in the sample image; and
    training the sample second unit model according to the sample image, the prediction mask, and the sample mask to obtain the image segmentation model.

4. The method according to claim 3, wherein the training the sample second unit model according to the sample image, the prediction mask, and the sample mask to obtain the image segmentation model comprises:
    generating a brightness loss according to the sample image, the prediction mask, and the sample mask;
    generating a segmentation loss according to the prediction mask and the sample mask;
    combining the brightness loss and the segmentation loss into a target loss;
    determining a parameter value of a model variable parameter in the sample second unit model based on a gradient descent rule and the target loss, and updating the model variable parameter in the sample second unit model according to the parameter value; and
    using, in a case that training counts reach a training count threshold, the sample second unit model with an updated model variable parameter as the second unit model, and combining the first unit model and the second unit model into the image segmentation model.

5. The method according to claim 1, wherein:
    the convolution pooling layer in the second unit model comprises a first convolution pooling layer and a second convolution pooling layer; and
    the downsampled mask comprises a first original mask corresponding to the first convolution pooling layer and a second original mask corresponding to the second convolution pooling layer.

6. The method according to claim 5, wherein the extracting the region convolution feature information of the target image based on the convolution pooling layer in the second unit model and the downsampled mask comprises:
    performing convolution and pooling on the target image based on the first convolution pooling layer and the first original mask to obtain first convolution feature information, and
    performing convolution and pooling on the first convolution feature information based on the second convolution pooling layer and the second original mask to obtain the region convolution feature information of the target image.

7. An apparatus for determining a target image region of a target object in a target image, the apparatus comprising:
    a memory storing instructions; and
    a processor in communication with the memory, wherein, when the processor executes the instructions, the processor is configured to cause the apparatus to perform:

obtaining an original mask and an image segmentation model, the image segmentation model comprising a first unit model and a second unit model;

downsampling the original mask based on a pooling layer in the first unit model to obtain a downsampled mask;

extracting region convolution feature information of a target image based on a convolution pooling layer in the second unit model and the downsampled mask;

updating the original mask according to the region convolution feature information; and in response to the updated original mask satisfying an error convergence condition, determining a target image region of a target object in the target image according to the updated original mask, wherein the target object is a lesion object; the target image is a biological tissue image; and the target image region is a lesion image region.

8. The apparatus according to claim 7, wherein when the processor executes the instructions, the processor is configured to further cause the apparatus to perform:

obtaining a sample image comprising the target object, and obtaining a sample original mask and a sample image segmentation model, the sample image segmentation model comprising the first unit model and a sample second unit model;

downsampling the sample original mask based on the pooling layer in the first unit model to obtain a sample downsampled mask; and generating a prediction mask based on the sample second unit model and the sample downsampled mask.

9. The apparatus according to claim 8, wherein when the processor executes the instructions, the processor is configured to further cause the apparatus to perform:

determining a sample mask according to an image region of the target object in the sample image; and training the sample second unit model according to the sample image, the prediction mask, and the sample mask to obtain the image segmentation model.

10. The apparatus according to claim 9, wherein when the processor is configured to cause the apparatus to perform training the sample second unit model according to the sample image, the prediction mask, and the sample mask to obtain the image segmentation model, the processor is configured to cause the apparatus to perform:

generating a brightness loss according to the sample image, the prediction mask, and the sample mask;

generating a segmentation loss according to the prediction mask and the sample mask;

combining the brightness loss and the segmentation loss into a target loss;

determining a parameter value of a model variable parameter in the sample second unit model based on a gradient descent rule and the target loss, and updating the model variable parameter in the sample second unit model according to the parameter value; and using, in a case that training counts reach a training count threshold, the sample second unit model with an updated model variable parameter as the second unit model, and combining the first unit model and the second unit model into the image segmentation model.

11. The apparatus according to claim 7, wherein:

the convolution pooling layer in the second unit model comprises a first convolution pooling layer and a second convolution pooling layer; and the downsampled mask comprises a first original mask corresponding to the first convolution pooling layer and a second original mask corresponding to the second convolution pooling layer.

12. The apparatus according to claim 11, wherein when the processor is configured to cause the apparatus to perform extracting the region convolution feature information of the target image based on the convolution pooling layer in the second unit model and the downsampled mask, the processor is configured to cause the apparatus to perform:

performing convolution and pooling on the target image based on the first convolution pooling layer and the first original mask to obtain first convolution feature information, and performing convolution and pooling on the first convolution feature information based on the second convolution pooling layer and the second original mask to obtain the region convolution feature information of the target image.

13. A non-transitory computer-readable storage medium, storing computer-readable instructions, wherein, the computer-readable instructions, when executed by a processor, are configured to cause the processor to perform:

obtaining an original mask and an image segmentation model, the image segmentation model comprising a first unit model and a second unit model;

downsampling the original mask based on a pooling layer in the first unit model to obtain a downsampled mask;

extracting region convolution feature information of a target image based on a convolution pooling layer in the second unit model and the downsampled mask;

updating the original mask according to the region convolution feature information; and in response to the updated original mask satisfying an error convergence condition, determining a target image region of a target object in the target image according to the updated original mask, wherein the target object is a lesion object; the target image is a biological tissue image; and the target image region is a lesion image region.

14. The non-transitory computer-readable storage medium according to claim 13, wherein, when the computer-readable instructions are executed by the processor, the computer-readable instructions are configured to cause the processor to perform:

obtaining a sample image comprising the target object, and obtaining a sample original mask and a sample image segmentation model, the sample image segmentation model comprising the first unit model and a sample second unit model;

downsampling the sample original mask based on the pooling layer in the first unit model to obtain a sample downsampled mask; and generating a prediction mask based on the sample second unit model and the sample downsampled mask.

15. The non-transitory computer-readable storage medium according to claim 14, wherein, when the computer-readable instructions are executed by the processor, the computer-readable instructions are configured to cause the processor to perform:

determining a sample mask according to an image region of the target object in the sample image; and training the sample second unit model according to the sample image, the prediction mask, and the sample mask to obtain the image segmentation model.

16. The non-transitory computer-readable storage medium according to claim 15, wherein, when the computer-readable instructions are configured to cause the processor to perform training the sample second unit model according to the sample image, the prediction mask, and the sample mask to obtain the image segmentation model, the computer-readable instructions are configured to cause the processor to perform:
- generating a brightness loss according to the sample image, the prediction mask, and the sample mask;
- generating a segmentation loss according to the prediction mask and the sample mask;
- combining the brightness loss and the segmentation loss into a target loss;
- determining a parameter value of a model variable parameter in the sample second unit model based on a gradient descent rule and the target loss, and updating the model variable parameter in the sample second unit model according to the parameter value; and
- using, in a case that training counts reach a training count threshold, the sample second unit model with an updated model variable parameter as the second unit model, and combining the first unit model and the second unit model into the image segmentation model.

17. The non-transitory computer-readable storage medium according to claim 13, wherein:
- the convolution pooling layer in the second unit model comprises a first convolution pooling layer and a second convolution pooling layer; and
- the downsampled mask comprises a first original mask corresponding to the first convolution pooling layer and a second original mask corresponding to the second convolution pooling layer.

* * * * *